US008954582B2

(12) United States Patent
Vasseur et al.

(10) Patent No.: US 8,954,582 B2
(45) Date of Patent: *Feb. 10, 2015

(54) MANAGING FATE-SHARING IN SHARED-MEDIA COMMUNICATION NETWORKS

(71) Applicant: Cisco Technology, Inc., San Jose, CA (US)

(72) Inventors: Jean-Philippe Vasseur, Saint Martin d'Uriage (FR); Jonathan W. Hui, Belmont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/154,875

(22) Filed: Jan. 14, 2014

(65) Prior Publication Data

US 2014/0136881 A1 May 15, 2014

Related U.S. Application Data

(63) Continuation of application No. 13/403,103, filed on Feb. 23, 2012, now Pat. No. 8,667,084.

(51) Int. Cl.

| H04L 12/26 | (2006.01) |
|---|---|
| G06F 11/20 | (2006.01) |
| H04W 40/34 | (2009.01) |
| H04L 12/707 | (2013.01) |
| H04L 12/703 | (2013.01) |
| H04L 12/24 | (2006.01) |
| H04L 12/721 | (2013.01) |

(52) U.S. Cl.
CPC ............ *H04L 43/04* (2013.01); *G06F 11/2002* (2013.01); *H04W 40/34* (2013.01); *H04L 45/22* (2013.01); *H04L 45/28* (2013.01); *H04L 41/145* (2013.01); *H04L 45/14* (2013.01)
USPC ............. 709/224; 714/4.1; 714/4.11; 714/41; 714/47.1; 714/47.2; 709/223; 709/217

(58) Field of Classification Search
CPC ... G06F 15/16; G06F 15/173; G06F 11/1464; G06F 1/00; G06F 2101/00; G06F 2200/00; G06F 2201/00; H04L 43/00; H04L 12/26; H04L 45/128; H04L 40/28; H04L 45/64; H04L 45/22; H04L 45/00; H04L 45/12; H04L 45/28; H04L 45/245; H04L 45/123; H04L 41/0663; H04L 41/145; H04L 45/23; H04L 1/00; H04L 2001/00; H04L 2201/00; H04L 2203/00; H04J 1/00; H04J 2011/00; H04J 2203/00; H04J 2211/00
USPC ............ 709/217, 223, 224; 714/4.1, 4.11, 41, 714/47.1, 47.2, 47.3
See application file for complete search history.

(56) References Cited

U.S. PATENT DOCUMENTS

| 7,349,326 B1 | 3/2008 | Zadikian et al. |
|---|---|---|
| 7,701,845 B2 | 4/2010 | Bryant et al. |

(Continued)

OTHER PUBLICATIONS

Winter, et al., "RPL: IPv6 Routing Protocol for Low Power and Lossy Networks", draft-ietf-roll-rpl-19, IETF Internet-Draft; Mar. 2011, 164 pages.

*Primary Examiner* — Douglas Blair
*Assistant Examiner* — Mehulkumar Shah
(74) *Attorney, Agent, or Firm* — Parker Ibrahim & Berg LLC; James M. Behmke; Stephen D. LeBarron

(57) ABSTRACT

In one embodiment, a management device receives one or more fate-sharing reports locally generated by one or more corresponding reporting nodes in a shared-media communication network, the fate-sharing reports indicating a degree of localized fate-sharing between one or more pairs of nodes local to the corresponding reporting nodes. The management device may then determine, globally from aggregating the fate-sharing reports, one or more fate-sharing groups indicating sets of nodes having a global degree of fate-sharing within the communication network. As such, the management device may then advertise the fate-sharing groups within the communication network, wherein nodes of the communication network are configured to select a plurality of next-hops that minimizes fate-sharing between the plurality of next-hops.

24 Claims, 20 Drawing Sheets

(56) References Cited

U.S. PATENT DOCUMENTS

| | | |
|---|---|---|
| 7,957,306 B2 | 6/2011 | Bryant et al. |
| 8,068,411 B2 | 11/2011 | Vasseur et al. |
| 8,072,879 B2 | 12/2011 | Vasseur et al. |
| 8,243,604 B2 | 8/2012 | Kothari et al. |
| 8,488,444 B2 | 7/2013 | Filsfils et al. |
| 2006/0056291 A1* | 3/2006 | Baker et al. .................... 370/229 |
| 2009/0228575 A1* | 9/2009 | Thubert et al. ................ 709/220 |
| 2009/0290497 A1* | 11/2009 | Gibbings ....................... 370/242 |
| 2012/0096182 A1* | 4/2012 | Gan .............................. 709/239 |

* cited by examiner

| NODE PAIR 710 | # BOTH FAILED 720 | # ONLY ONE FAIL 730 |
|---|---|---|
| 22-23 | 25 | 0 |
| 23-24 | 1 | 13 |
| 24-34 | 10 | 2 |
| 22-24 | 7 | 6 |
| 22-32 | 0 | 12 |
| ... | ... | ... |

RECORD 700

FIG. 7

FATE-SHARING TABLE 1000

| GROUP 1010 | NODES 1020 | WEIGHT 1030 |
|---|---|---|
| FS-1 | 12, 22, 23 | 1 |
| FS-2 | 31, 32, 41, 42 | 0.5 |
| FS-3 | 24, 34, 45 | 0.6 |
| ... | ... | ... |

MANAGING FATE-SHARING IN SHARED-MEDIA COMMUNICATION NETWORKS

RELATED APPLICATION

This application is continuation of U.S. patent application Ser. No. 13/403,103, filed Feb. 23, 2012, by Vasseur, et al., the contents of which are hereby incorporated by reference.

TECHNICAL FIELD

The present disclosure relates generally to computer networks, and, more particularly, to fate-sharing between links in shared-media communication networks.

BACKGROUND

Shared-media communication networks, such as wireless networks or power-line communication (PLC) networks (a type of communication over power-lines), provide an enabling technology for networking communication. Shared-media, however, is generally a physical medium that is strongly affected by environmental conditions that change over time. Some examples include temporal changes in interference (e.g., other wireless networks or electric appliances), physical obstruction (e.g., doors opening and/or closing or seasonal changes in foliage density of trees), and propagation characteristics of the physical media (e.g., temperature or humidity changes). The time scales of such temporal changes can range between milliseconds (e.g., transmissions from other wireless networks) to months (e.g., seasonal changes of outdoor environment).

It is not rare in many types of networks for each node to have a very large number of neighbors that are potential next-hops in a routing topology. As defined generally by routing protocols for these types of networks, links are considered independently of each other. Consider a set of neighbors in a wireless environment: if a node N has the choice between K neighbors, it will select one or more next-hop routes based on the advertised cost, the Objective Function, and possibly constraints.

That said, the shared physical medium naturally leads to "fate-sharing" between different links. It is common to have groups of links that are affected by the same source of perturbation. Neglecting the notion of fate-sharing in the route selection process results in potentially selecting a set of next-hop routes that are affected by the same source of perturbation. As a result, when link connectivity fails for one next-hop route, the same could be true for all other next-hop routes that serve as a backup. This may also be an issue when using "1+1" protection where traffic is duplicated over diverse paths. Searching for new next-hop routes is a time consuming process and is undesirable.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 7 illustrates an example of a localized fate-sharing record;
FIG. 10 illustrates an example of a global fate-sharing table.

DESCRIPTION OF EXAMPLE EMBODIMENTS

Overview

Figure 1:
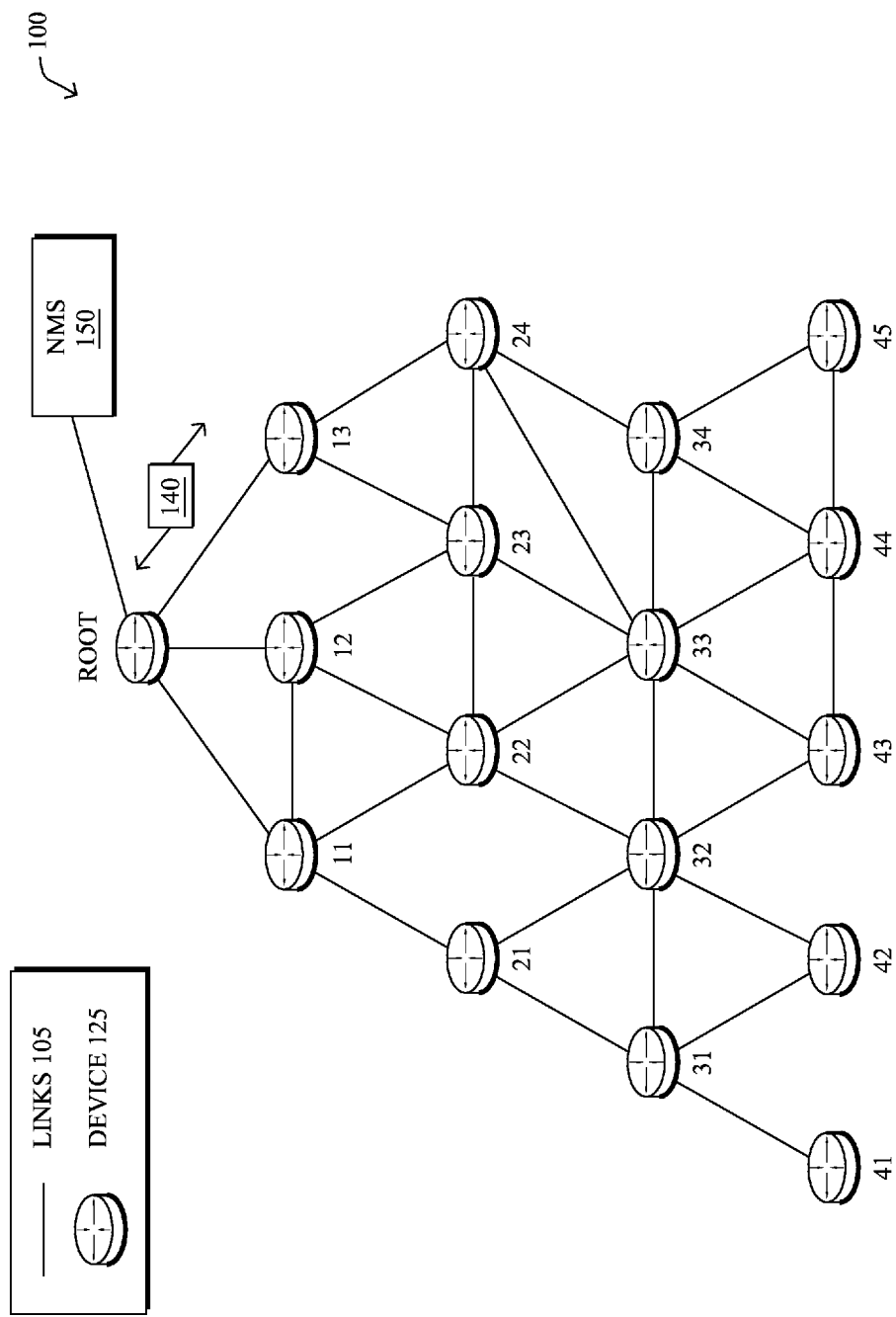
FIG. 1 illustrates an example communication network.

According to one or more embodiments of the disclosure, a management device receives one or more fate-sharing reports locally generated by one or more corresponding reporting nodes in a shared-media communication network, the fate-sharing reports indicating a degree of localized fate-sharing between one or more pairs of nodes local to the corresponding reporting nodes. The management device may then determine, globally from aggregating the fate-sharing reports, one or more fate-sharing groups indicating sets of nodes having a global degree of fate-sharing within the communication network. As such, the management device may then advertise the fate-sharing groups within the communication network, wherein nodes of the communication network are configured to select a plurality of next-hops that minimizes fate-sharing between the plurality of next-hops.

Moreover, according to one or more additional embodiments of the disclosure, a particular node in the shared-media communication network may locally generate one or more fate-sharing reports, the fate-sharing reports indicating a degree of localized fate-sharing between one or more pairs of nodes local to the particular node, and sends the one or more fate-sharing reports to the management device, which is configured to determine, globally from aggregated fate-sharing reports, one or more fate-sharing groups indicating sets of nodes having a global degree of fate-sharing within the communication network. Based on receiving the fate-sharing groups from the management device, the particular node may then select a plurality of next-hops from the particular node that minimizes fate-sharing between the plurality of next-hops based on the fate-sharing groups, accordingly.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth. Correspondingly, a reactive routing protocol may, though need not, be used in place of a proactive routing protocol for smart object networks.

FIG. 1 is a schematic block diagram of an example computer network 100 illustratively comprising nodes/devices 125 (e.g., labeled as shown, "root," "11," "12," . . . "45") interconnected by various methods of communication. For instance, the links 105 may be wired links or shared media (e.g., wireless links, PLC links, etc.) where certain nodes 125, such as, e.g., routers, sensors, computers, etc., may be in communication with other nodes 125, e.g., based on distance, signal strength, current operational status, location, etc. In addition, various other devices, such as a head-end application device, Central Intelligence Controller (CIC), or a network management server (NMS) 150 (generally referred to herein as "NMS 150") may be present in the network 100, such as via a WAN reachable by node 11-45 through the root node. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
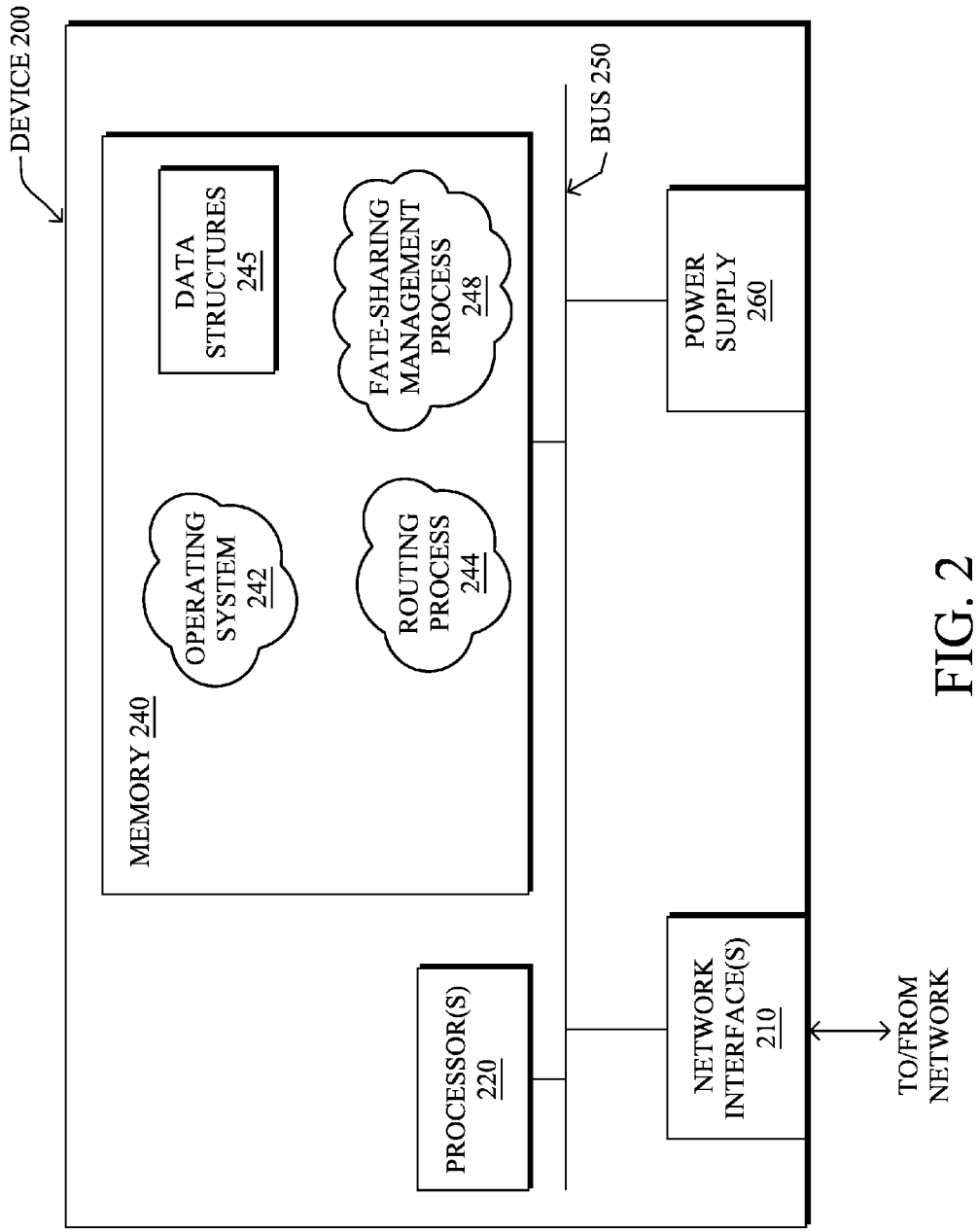
FIG. 2 illustrates an example network device/node.

FIG. 2 is a schematic block diagram of an example node/device 200 that may be used with one or more embodiments described herein, e.g., as any of the nodes 125 shown in FIG. 1 above, and also NMS 150. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, and an illustrative fate-sharing management process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Internet Draft, entitled "RPL: IPv6 Routing Protocol for Low Power and Lossy Networks" <draft-ietf-roll-rpl-19> by Winter, et al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by routing process 244 and/or a specific DAG process) based on an Objective Function (OF). The role of the Objective Function is generally to specify rules on how to build the DAG (e.g. number of parents, backup parents, etc.).

Figure 3:
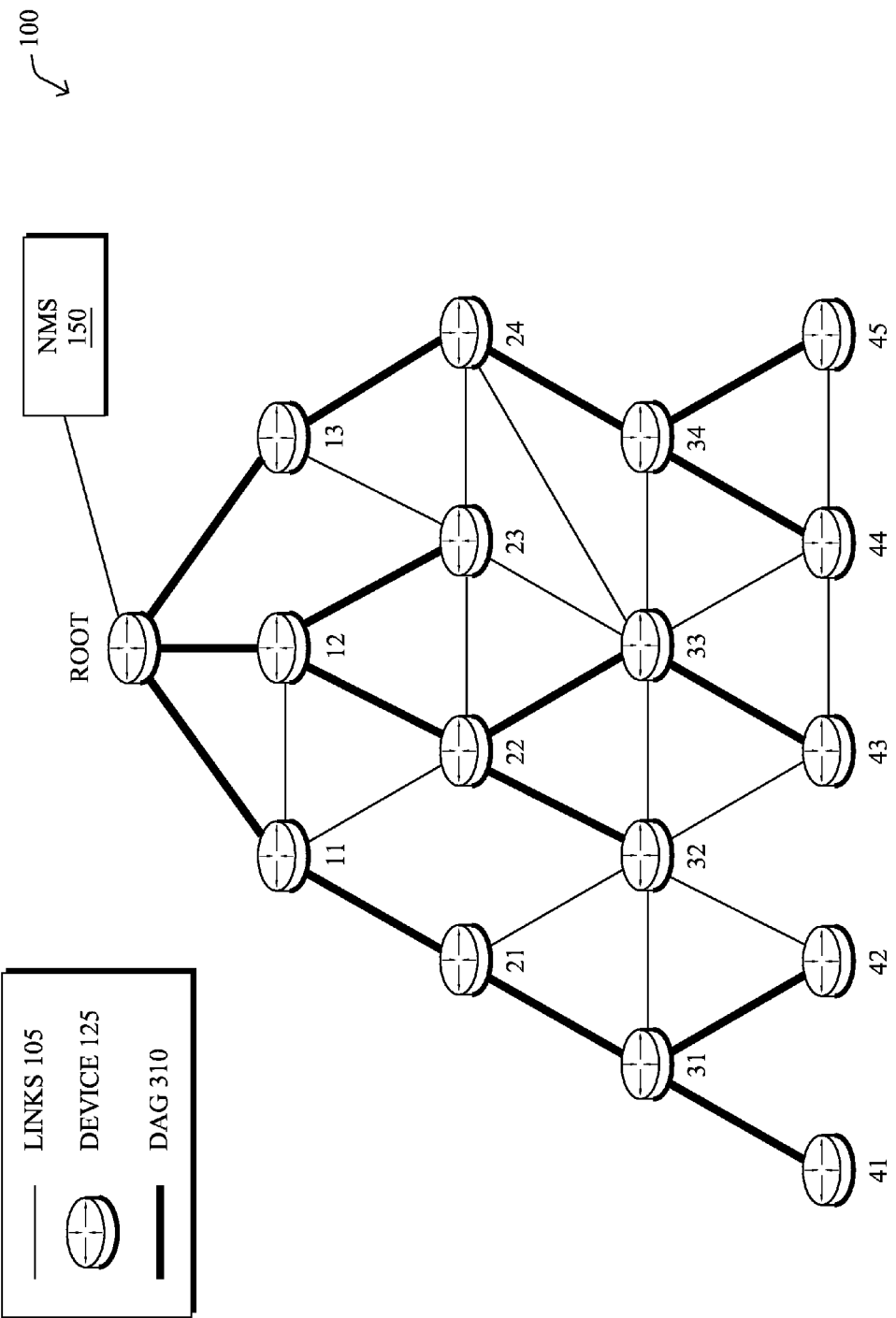
FIG. 3 illustrates an example directed acyclic graph (DAG) in the communication network of FIG. 1.

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as solid bolded lines), which extends from the root node toward one or more leaf nodes (nodes without children). Traffic/packets 140 (shown in FIG. 1) may then traverse the DAG 310 in either the upward direction toward the root or downward toward the leaf nodes, particularly as described herein. In addition, the creation of the DAG may also provide for one or more alternate parents (next-hops), such as those shown in the dashed bolded lines, accordingly. Note that while a DAG 310 is shown, other routing topologies may be created, and a DAG is merely one example of a routing protocol topology that may be created and utilized according to the techniques described herein.

As noted above, shared-media communication networks, such as wireless networks or power-line communication (PLC) networks, provide an enabling technology for networking communication. Shared-media, however, is generally a physical medium that is strongly affected by environmental conditions that change over time. Some examples include temporal changes in interference (e.g., other wireless networks or electric appliances), physical obstruction (e.g., doors opening and/or closing or seasonal changes in foliage density of trees), and propagation characteristics of the physical media (e.g., temperature or humidity changes). The time scales of such temporal changes can range between milliseconds (e.g., transmissions from other wireless networks) to months (e.g., seasonal changes of outdoor environment).

To address these challenges, routing protocols operating in shared-media environments, such as LLNs/IoT networks, typically select multiple next-hops, e.g., a preferred and a back-up (or back-ups), to form a robust solution towards a destination. In addition, the ability to build diverse paths is important for the Internet of Things (IoT) such as for load-balancing or else for a number of critical/real-time applications where "1+1" protection techniques consisting of duplicating critical packets and sending them along diverse paths is a strong requirement. Indeed, for such packets, links are so lossy that sending a single copy along a path has a high probability of being lost (and being retransmitted, which involves additional delays), especially when the path diameter increases, particularly since the path's Packet Error Rate increases exponentially with the path length. In addition to "1+1" protection (where two diverse packets are sent, one on the primary path and one on the/each diverse path), "1:1" protection is also available where the diverse path(s) is/are used only in response to detecting a failure of the primary path. That is, in "1:1" protection, by having each node maintain multiple routes, a device may quickly retransmit packets using different links (e.g., back-up next-hops) in case transmission failures occur (e.g., on the preferred next-hop).

The computation of preferred and back-up next-hops is well-known in routing protocols, such as distance vector routing protocols. Existing routing protocols, however, currently generally select next-hops (e.g., and full routes) that only minimize a specified cost (e.g., hop count or Estimated Transmission Count (ETX), etc.). That is, as noted above, it is not rare in many types of networks (e.g., LLNs) for each node to have a very large number of neighbors that are potential next-hops in a routing topology. Though as defined generally by routing protocols for these types of networks, links are considered independently of each other, e.g., selecting one or more next-hop routes (parents in RPL terminology) based on the advertised cost, the Objective Function, and possibly constraints.

These existing solutions thus do not address another important characteristic of shared-media link technologies. In particular, shared-media link technologies (including both wireless and PLC) communicate using a shared physical medium where links are susceptible to interference, such as where simultaneous transmissions from devices in the same network can disrupt each other, etc. However, as mentioned, shared-media link technologies are also susceptible to external interference, such as where changes in environment and spurious noise can disrupt transmissions within the network.

Both external and internal interference generally have a high spatial locality, that is, the interference affects devices within physical proximity of the interference source. An example form of internal interference is a device transmitting, which affects all other devices within transmission range. An example form of external interference is an electronic device emitting spurious noise. In both examples, the interference source only affects those devices within close physical proximity. In general, the magnitude of the interference decreases with distance from the source. As such, the shared physical medium naturally leads to "fate-sharing" between different links, where it is common to have groups of links that are affected by the same source of perturbation. Note that such sources of interference are usually very difficult to predict.

Neglecting the notion of fate-sharing in the route selection process results in potentially selecting a set of next-hop routes that are affected by the same source of perturbation. As a result, when link connectivity fails for one next-hop route, the same could be true for all other next-hop routes that serve as a backup. Searching for new next-hop routes is a time consuming process and is undesirable.

Fate-sharing Management

Fate-sharing (or risk sharing) is defined herein as an indication that conveys how likely two (or more) nodes may be affected by the same sources of internal and external interference. Generally, links that are nearby in physical proximity are more likely to be affected by the same kinds of internal and external interference. As a result, links nearer to each other may generally have a higher degree of fate-sharing than links that are further away from each other. While existing routing protocols do select multiple next-hops, they rarely select them in a manner that attempts to reduce the amount of fate-sharing between those nodes.

The techniques herein elaborate a model of fate-sharing between nodes whereby nodes keep track of simultaneous failures between nodes thanks to historical/statistical observations. Fate-sharing (FS) groups may then be computed by the NMS 150 (or other collection engine) based on collected reports from the nodes in the network, and then distributed back to the end nodes. As such, a new back-up next-hop selection decision criteria may be added so as to take into account the degree of fate-sharing to thus avoid selecting a back-up next-hop that has a high chance of being affected by the same perturbation than the preferred next-hop (e.g., while still considering the path cost stretch provided by the back-up next-hop).

Specifically, according to one or more embodiments of the disclosure as described in detail below, nodes in the shared-media communication network may locally generate one or more fate-sharing reports, the fate-sharing reports indicating a degree of localized fate-sharing between one or more pairs of nodes local to the nodes, and send the one or more fate-sharing reports to the management device. The management device receives one or more fate-sharing reports locally generated by one or more corresponding reporting nodes in a shared-media communication network, the fate-sharing reports indicating a degree of localized fate-sharing between one or more pairs of nodes local to the corresponding reporting nodes. The management device may then determine, globally from aggregating the fate-sharing reports, one or more fate-sharing groups indicating sets of nodes having a global degree of fate-sharing within the communication network. As such, the management device may then advertise the fate-sharing groups within the communication network, where based on receiving the fate-sharing groups from the management device, the network nodes may then select a plurality of next-hops from themselves that minimizes fate-sharing between the plurality of next-hops, accordingly.

Illustratively, the techniques described herein may be performed by hardware, software, and/or firmware, such as in accordance with the fate-sharing management process 248, which may contain computer executable instructions executed by the processor 220 to perform functions relating to the techniques described herein, e.g., in conjunction with routing process 244. For example, the techniques herein may be treated as extensions to conventional routing protocols, such as the illustrative RPL protocol, and as such, may be processed by similar components understood in the art that execute those protocols, accordingly. (Note that RPL is merely an example routing protocol, and the embodiments herein are not limited to use with the RPL protocol, accordingly.)

Operationally, the first component of the techniques herein consists of inferring nodes (or links) that might share fate. The general purpose of the fate-sharing determination is to allow comparisons between different next-hop node selection. In particular, two devices that are more likely to be affected by the same sources of external and internal interference would more likely share the same fate (e.g., might fail or otherwise lose connectivity at the same time) than two devices that are less likely to be affected by the same sources of external and internal interference. Typically, in contrast with conventional IP/MPLS networks, it is not possible to know a priori the fate-sharing characteristic between pairs of nodes (e.g., particularly in an LLN).

Figure 4:
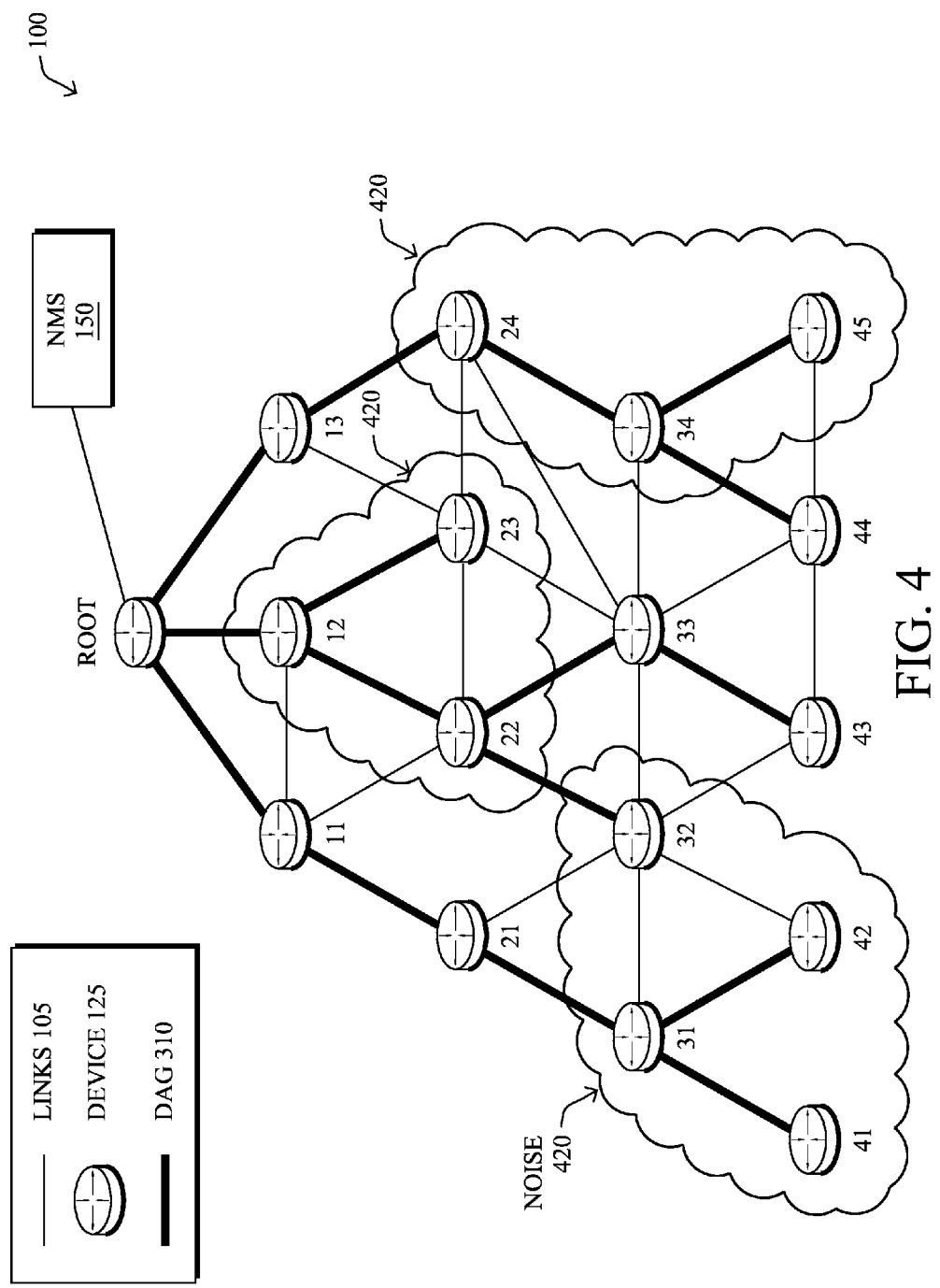
FIG. 4 illustrates an example of interference-based fate-sharing.

As shown in FIG. 4, for example, various sources of perturbation (e.g., noise 420) may transiently occur within the network, causing various levels of interference with the shared-media communication as mentioned above. Indeed, if node 12, node 22, and node 23 are located near a single noise source, then they may each be affected whenever that noise is present. Similarly, as shown, nodes 31, 32, 41, and 42 may be affected in generally the same manner by another noise source, and nodes 24, 34, and 45, too, by still another noise 420. The techniques herein, therefore, are directed at determining which sets of devices/nodes 125 are affected at the same time, such as from shared noise events 420, thus dynamically identifying fate-sharing groups. Note that such noise sources may be stationary and transient (e.g., manufacturing motors starting and stopping), or else may be entirely mobile (e.g., trucks driving down a street), hence the need to not only locate the fate-sharing groups, but to also account for their dynamicity.

Figure 5:
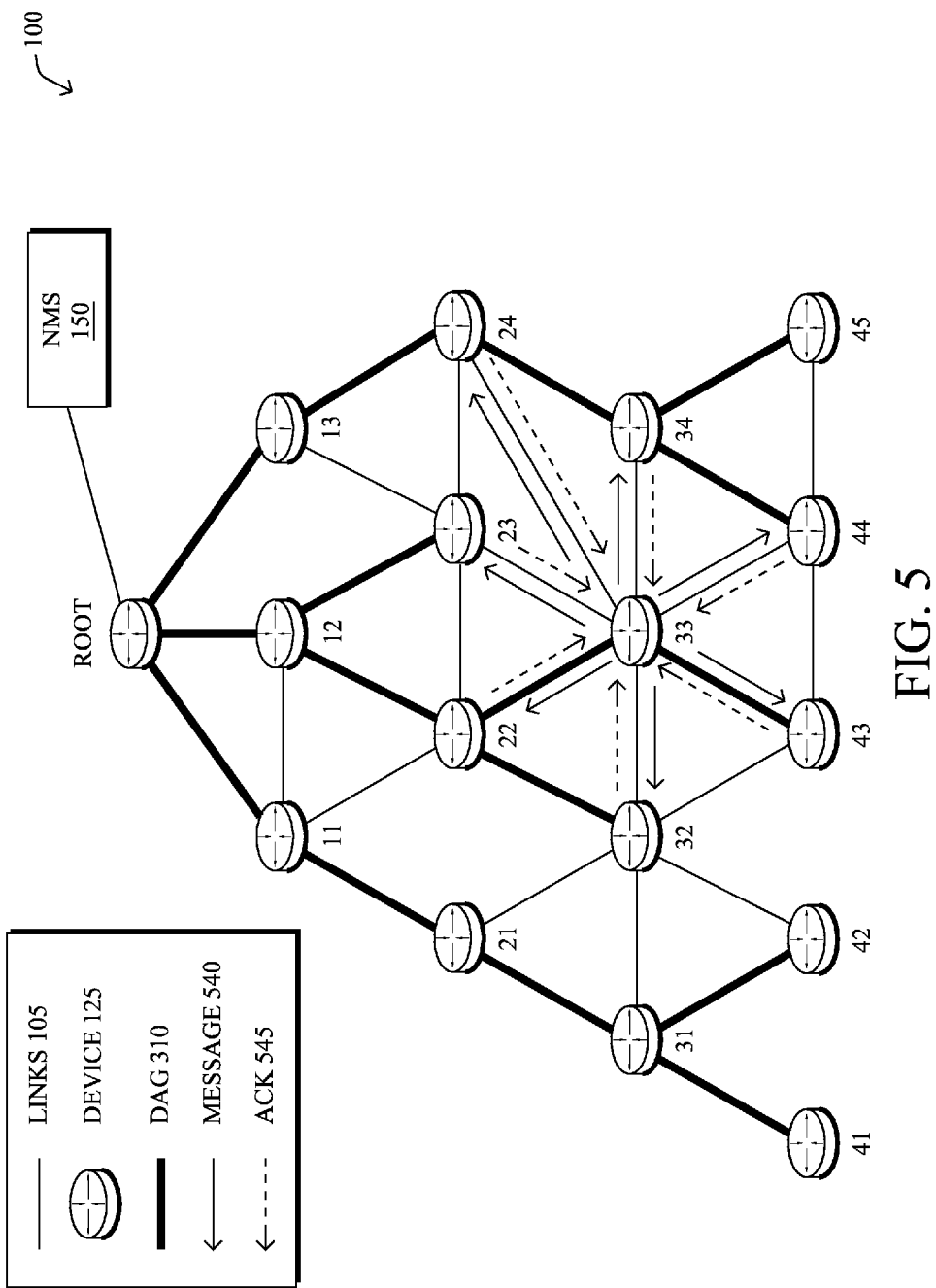
FIG. 5 illustrates an example message exchange.

According to one or more embodiments herein, particular nodes 125 within the network 100 may locally generate fate-sharing reports that indicate a degree of localized fate-sharing between one or more pairs of nodes local to the particular node. As shown in FIG. 5, the degree of localized fate-sharing between one or more pairs of nodes may be determined based generally on sending messages 540 to the one or more pairs of nodes. For example, with a protocol such as RPL, link failures may be detected upon sending a data packet (data message 540). Alternatively, nodes may make use of active probing (keepalive messages 540), or else explicit fate-sharing probe messages 540 may be used. For instance, if keepalives are not used for routing adjacency maintenance, a node may choose to start a cycle of local probing to N nodes (e.g., where N may be greater than k, the number of next-hops maintained by the node in its routing table) every x minutes (or according to pre-defined schedules distributed by the NMS), in order to perform some fate-sharing calculation.

Regardless of the type of message, whether a corresponding node/device 120 (link) has failed, that is, has become unreachable, may be based on whether a link-layer acknowledgment (ACK) 545 is returned in response to the message 540. Alternatively, or in addition, an IPv6 Neighbor Unreachability Detection (NUD) message may also be used to explicitly indicate failure in reaching the corresponding device.

Figure 6:
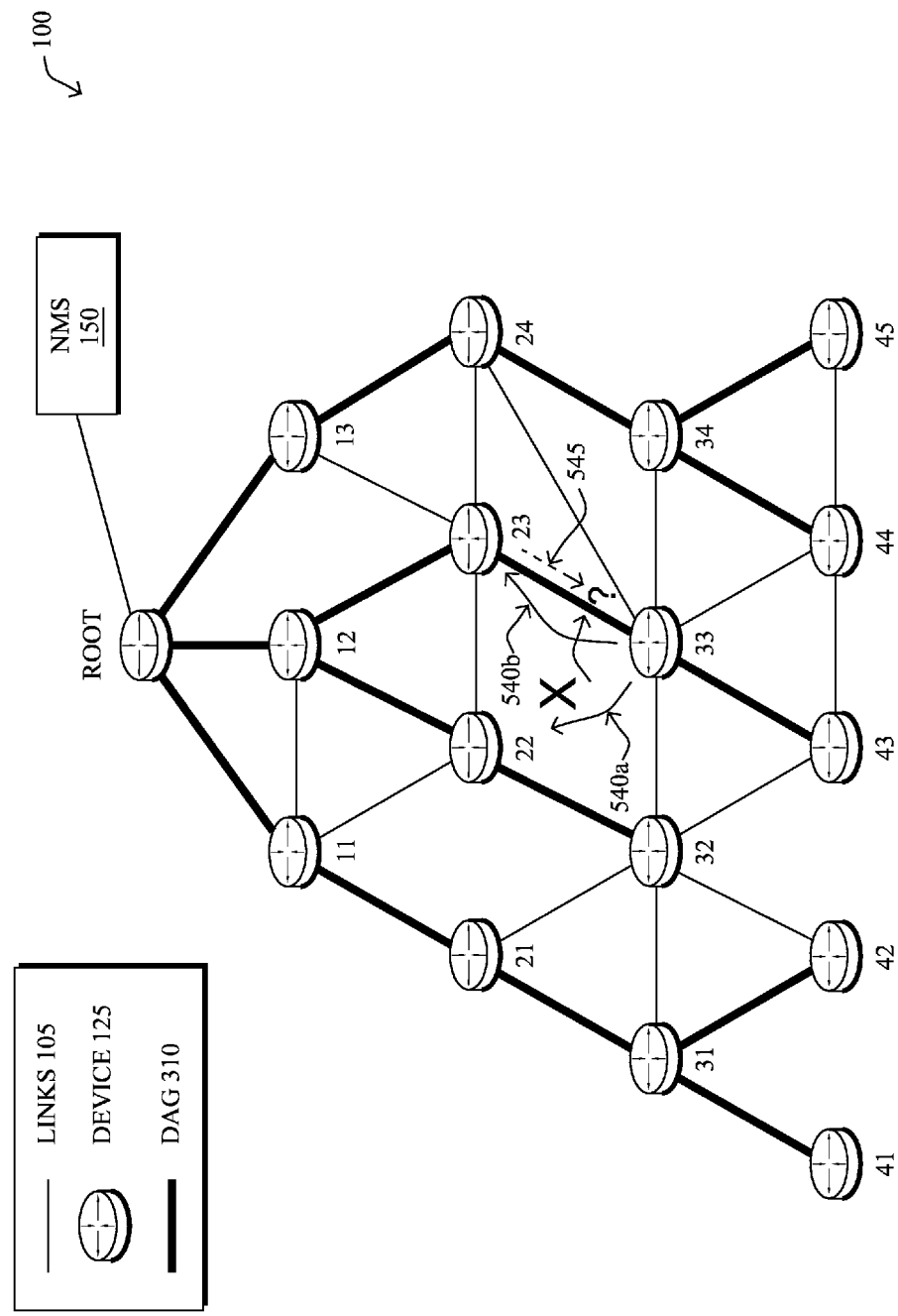
FIG. 6 illustrates an example back-up next-hop selection.

FIG. 6 shows an example fate-sharing determination, in one specific illustrative (and non-limiting) embodiment, where a particular network device 125 (e.g., node 33) first detects a primary link failure (e.g., to node 22) using data messages 540. That is, if the link is determined as "down" based on not receiving an ACK 545 (or based on receiving a NUD), the particular node detects a failure of its primary next-hop, and then selects a back-up next-hop (e.g., node 23) and resends the message 540. If the back-up next-hop is also "down," that is, in response to failure of the back-up next-hop, the particular node may record that both the primary next-hop and back-up next-hop failed at the same time (i.e., that both nodes were unreachable at the same time). Conversely, if the back-up next-hop is "up," that is, response to functionality of the back-up next-hop, the particular node may record that the back-up next-hop did not fail at the same time as the primary next-hop (i.e., that the back-up next-hop was reachable while the primary next-hop was not).

According to one or more embodiments herein, the degree of localized fate-sharing between the primary next-hop and back-up next-hop may thus be determined based on a comparison between a number of times that both the primary next-hop and back-up next-hop failed at the same time versus a number of times that the back-up next-hop did not fail at the same time as the primary next-hop. FIG. 7 illustrates an example record 700 (e.g., a data structure) stored at a node 125 that indicates such fate-sharing numbers. For instance, the report/record may consist of two simple counters per node pair 710 (thus alternatively referred to as a "link"), that is, one counter 720 that is incremented one when both next-hops/nodes are down (failed), and another counter 730 that is incremented when only one of the two nodes is down. Note that the table 700 may be continual (numbers never reset), may be periodically refreshed (e.g., certain numbers or certain node pair numbers reset occasionally), or may be a rolling record (e.g., numbers reflect counts within the past day/week/month/etc.). Note further that additional fields, such as timestamps, may also be used within the table, and the view shown herein is for simplicity.

As an example, as shown in FIG. 7, assuming the particular node managing the table 700 is node 33, nodes 22 and 23 may have failed together 25 times, while never failing only one at a time. Conversely, nodes 23 and 24 may have each independently failed for a total of 13 times (notably not indicating exactly which of the two nodes failed), but have failed simultaneously only once. Other counter values between various node pairs 710 are also shown, and may be maintained by the particular node (e.g., node 33). Note that the node pairs 710 may be based on each and every node combination available to the particular node, or else may simply be any pair of nodes that have been used in a primary/back-up arrangement together at some point. That is, rather than keep track of all of the possible relationships, the techniques herein provide for enhanced scalability by creating a maintaining relationship only for those node pairs that are related is through failure of a first next-hop, and failure/function of a back-up second next-hop.

As noted above, therefore, based on the fate-sharing record 700, the degree of localized fate-sharing between one or more pairs of nodes may thus be determined based on a ratio of a number of times communication with a specific pair of nodes failed at the same time versus a number of times the communication with the specific pair of nodes did not fail at the same time. (Note that the term "ratio" need not be specific to the numbers within counters 720 and 730, e.g., 720:730, but may instead be merely based on how often, in comparison, one type of event occurs with relation to the other.)

Figure 8:
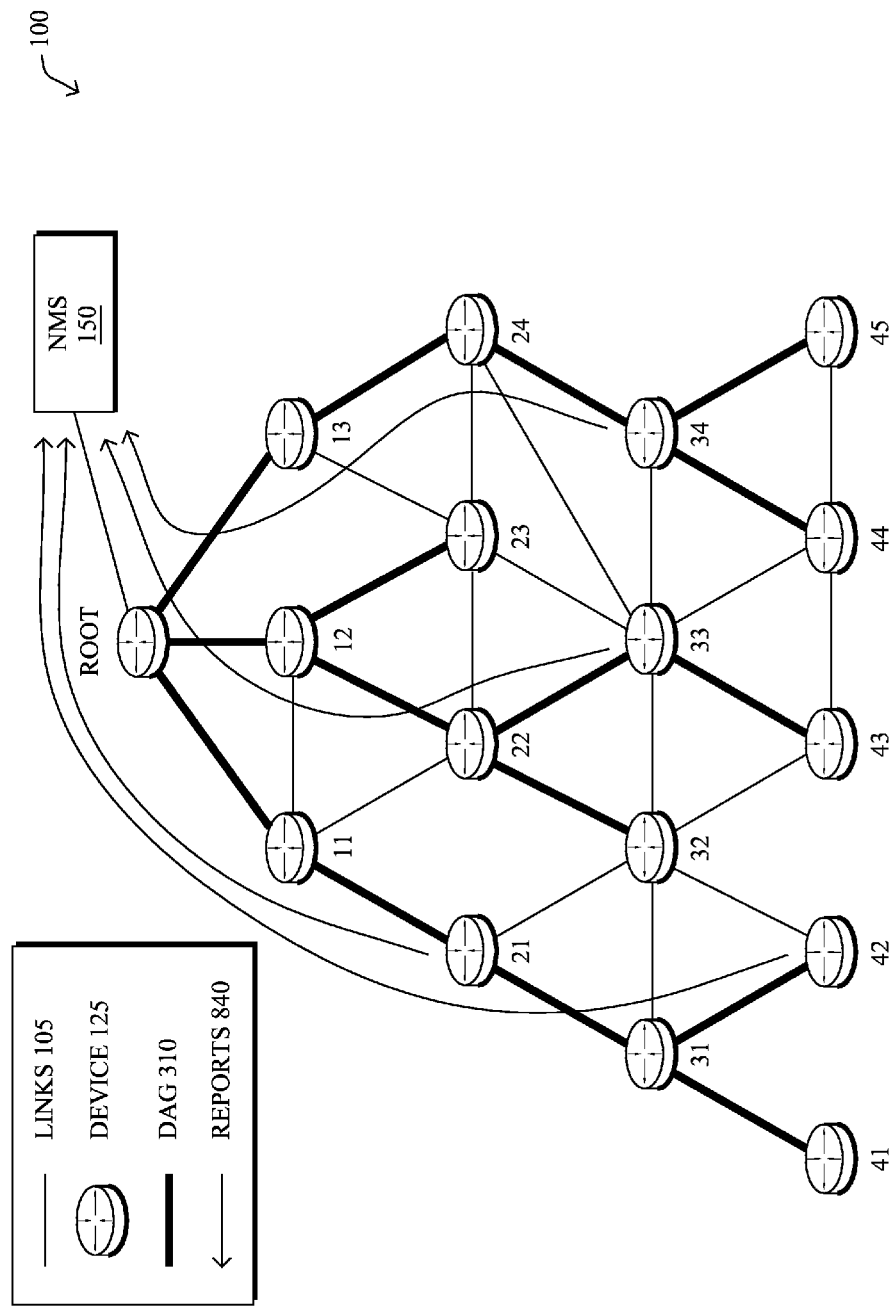
FIG. 8 illustrates an example reporting exchange.

As shown in FIG. 8, various network nodes may then send the one or more fate-sharing reports 840 having the localized fate-sharing conclusions (e.g., the counter values themselves or else a new indicative value) to a management device of the communication network, such as NMS 150 (notably, or the DAG root, a collection engine, or other head-end application (thus NMS is used herein as a generic term). The fate-sharing reports may be sent as dedicated report messages, or may be included within routing control messages, such as grouping the localized fate-sharing information with other NMS-related information to reduce management traffic within the network 100. In addition, e.g., for reactive routing protocols, the report messages may also be carried in a route request (RREQ) messages/probes, where the localized fate-sharing data may be collected by the probe.

Notably, a node may decide to send a fate-sharing report if the corresponding value (the degree of localized fate-sharing) has surpassed a configured threshold, such as a set number, a rate of change (e.g., the second derivative), etc. Also, to avoid reporting transient phenomena, nodes may also implement low-pass filters locally.

Figure 9:
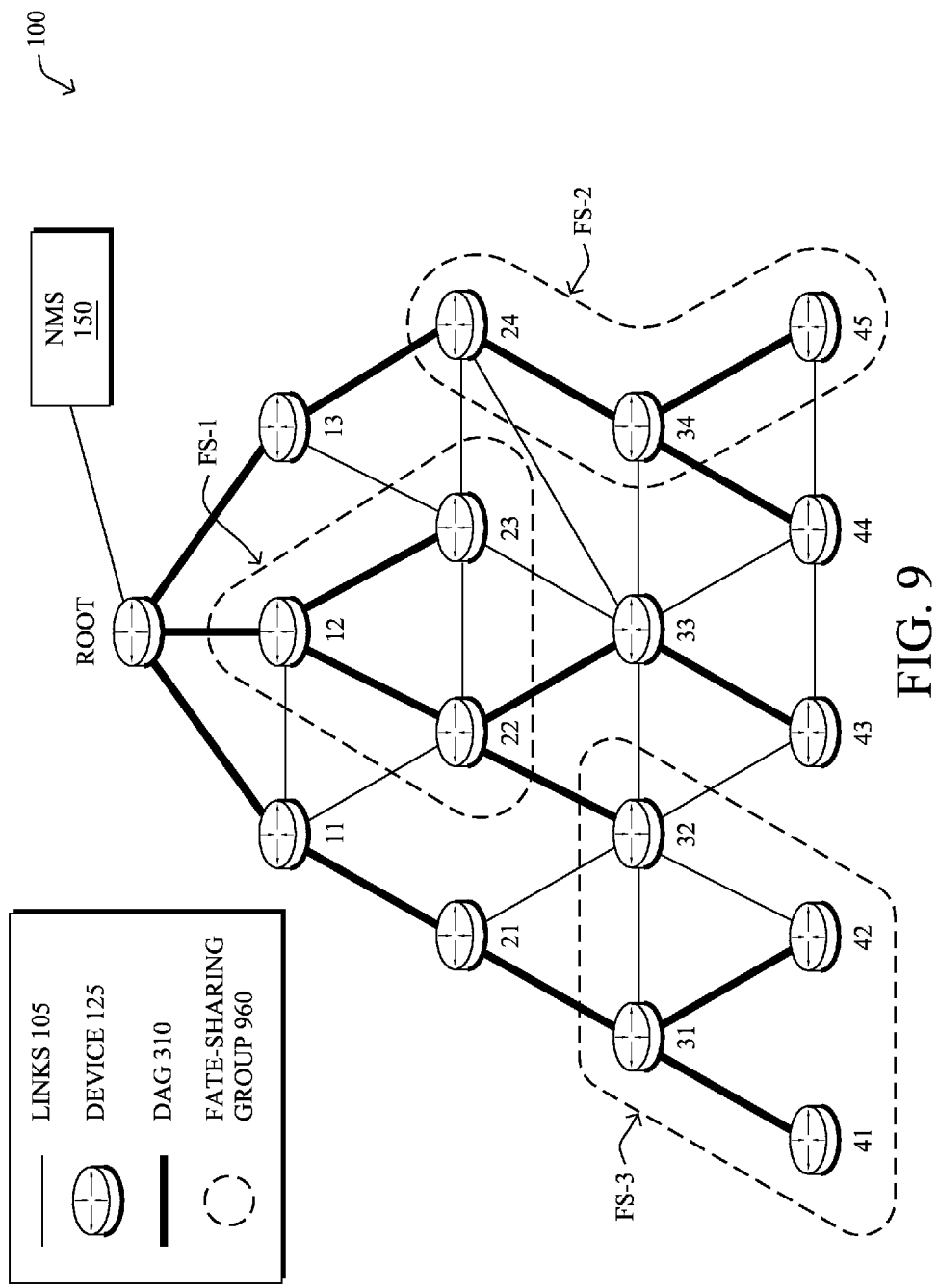
FIG. 9 illustrates an example of fate-sharing groups.

The reports 840 may then be received by the management device, and the management device may then aggregate the one or more fate-sharing reports to determine, globally from the aggregated fate-sharing reports, one or more fate-sharing groups indicating sets of nodes having a global degree of fate-sharing within the communication network. As shown in FIG. 9, for example, based on the received reports 840, the management device (NMS 150) may determine sets of nodes that fail in tandem, most likely due to a shared perturbation source (e.g., noises 420 from FIG. 4 above). These sets of nodes may then be related into fate-sharing groups 960, e.g., "FS-1," "FS-2," and "FS-3" as shown. Note that the management device may be typically aware of the routing topology to make such associations due to routing control messages (e.g., RPL DAO messages, route request (RREQ) messages with reactive protocols, or link-state messages).

For example, assuming that the management node heard that node 22 and 23 very often fail together, and also that nodes 12 and 22, and optionally nodes 12 and 23, also fail together frequently, then the fate-sharing group 960 called "FS-1" may be established as nodes 12, 22, and 23 . Note that based on the transitive property, it is not necessary when the fate-sharing is very high to hear that nodes 12 and 23 fail together in order to include them in the same fate-sharing group. Note also that while the fate-sharing groups show a small number of nodes, in many real scenarios, where network density provides for hundreds of neighbors, the fate-sharing groups may be much larger in size, may overlap each other, and may be much more complex, generally, that what is shown and described herein (for clarity).

Illustratively, as shown in FIG. 10, a fate-sharing table structure 1000 (a data structure 245) may be created at the management device based on the fate-sharing groups as determined. For instance, fate-sharing groups 960 may be entered into the field 1010 of the table 1000, and the associated nodes (or links) 1020 may be stored in a corresponding entry. Notably, the entries 1020 may change dynamically over time, such as due to changes in location, changes in noise sources, etc. As shown, FS-1 comprises nodes 12, 22, and 23, FS-2 comprises nodes 31, 32, 41, and 42, and FS-3 comprises nodes 24, 34, and 45, which corresponds to the fate-sharing groups 960 in FIG. 9 (and which may be illustratively caused by the underlying noise 420 of FIG. 4). According to one or more specific embodiments herein, a "confidence weighting factor" or simply "weight" 1030 may be applied to the fate-sharing groups 1010. In particular, the weight may provide some indication on how confident the NMS is that the nodes assigned to a is fate-sharing group are, in fact, affected by the same perturbation that causes them to fail at the same time. For example, the weights may be based on the localized fate-sharing ratios, or based on a number of reporting nodes that report the same phenomena, etc.

In particular, in one example embodiment, the NMS may determine that nodes are in the same fate-sharing groups by summing and normalizing the fate-sharing reports 840 from different network devices. In particular, when considering nodes "A" and "B," the NMS may sum all the fate-sharing counts reported by the devices and normalize by the number of total messages sent using those nodes. The NMS can also normalize based on the number of devices that have both A and B as routing adjacencies, where the fraction of these devices that report fate-sharing between nodes A and B may be considered as part of the weight value.

Figure 11:
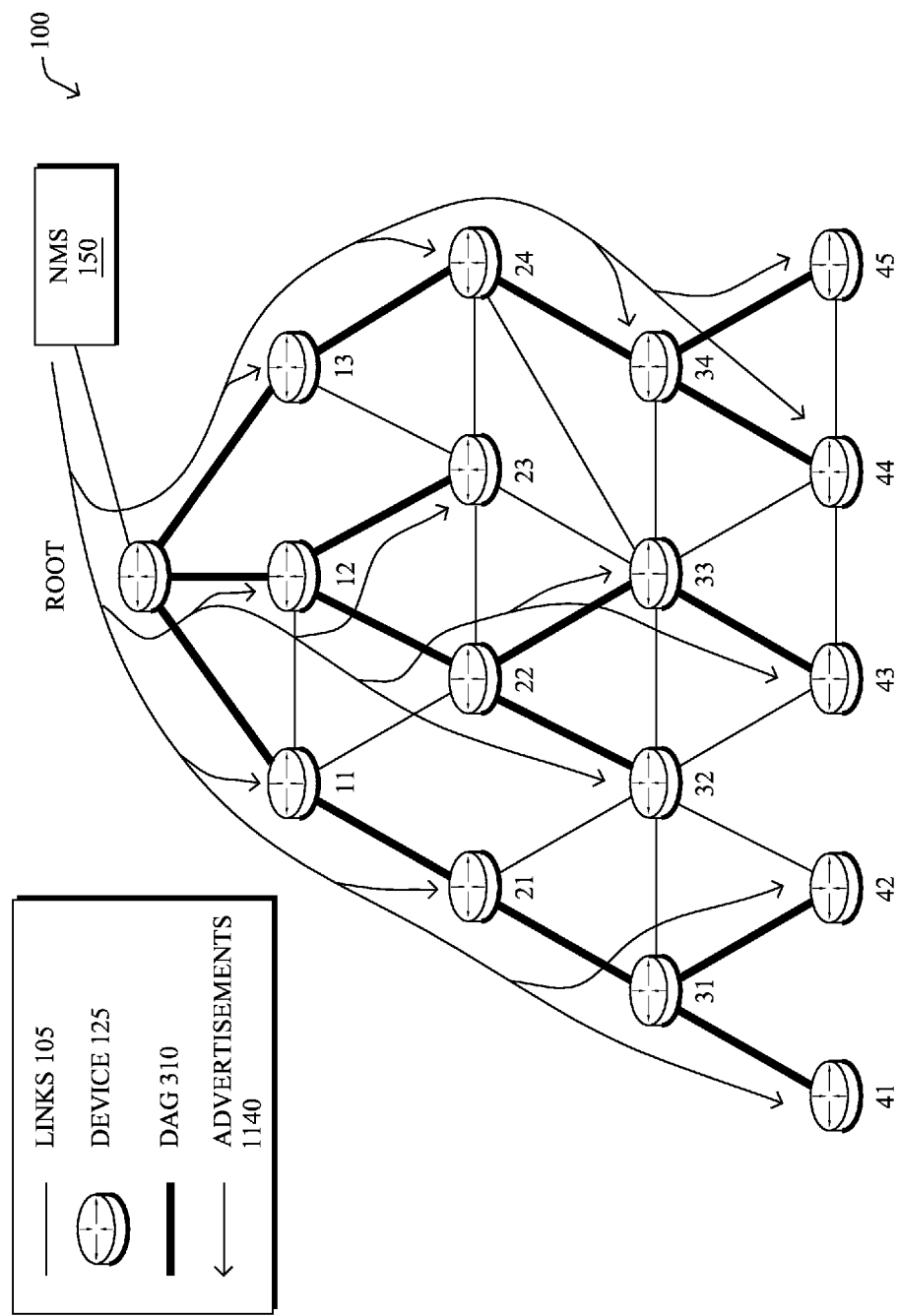
FIG. 11 illustrates an example advertisement exchange.

The fate-sharing groups (potentially augmented with a weight value) may then be distributed into the network, such as through advertisements 1140 as shown in FIG. 11. For instance, advertisements 1140 may be specific messages distributed into the network, e.g., multicast, broadcast, etc., or else may be information piggybacked into routing protocol control messages. Note also that various hysteresis mechanisms may be employed by the NMS to avoid signaling unconfirmed or transient fate-sharing group (or weight) changes.

Prior to the techniques herein, two criteria are used by nodes to select best next-hops (preferred and back-up), namely, the advertised path cost (potentially augmented with constraints when present) and an objective function. According to the techniques herein, however, a third parameter may be added (which can be part of the OF), i.e., the fate-sharing of the nodes. Said differently, upon receiving the fate-sharing groups 960 from the management device (e.g., in advertisements 1140), the network nodes 125 may then select a plurality of next-hops based on the fate-sharing groups that minimizes fate-sharing between the plurality of next-hops, in addition to potentially other routing metrics and constraints. In doing so, the device increases the overall network robustness by selecting routes that are less likely to be affected by the same sources of interference. Without such a notion, the use of back-up next hops may be essentially ineffective. Notably, these next-hops may be used to route traffic, such as for back-up protection, when utilizing a redundant protection scheme such as 1+1 protection or 1:1 protection, load-balancing traffic, or for creating a primary or a plurality of routing topologies (e.g., DAGs 310).

Figure 12:
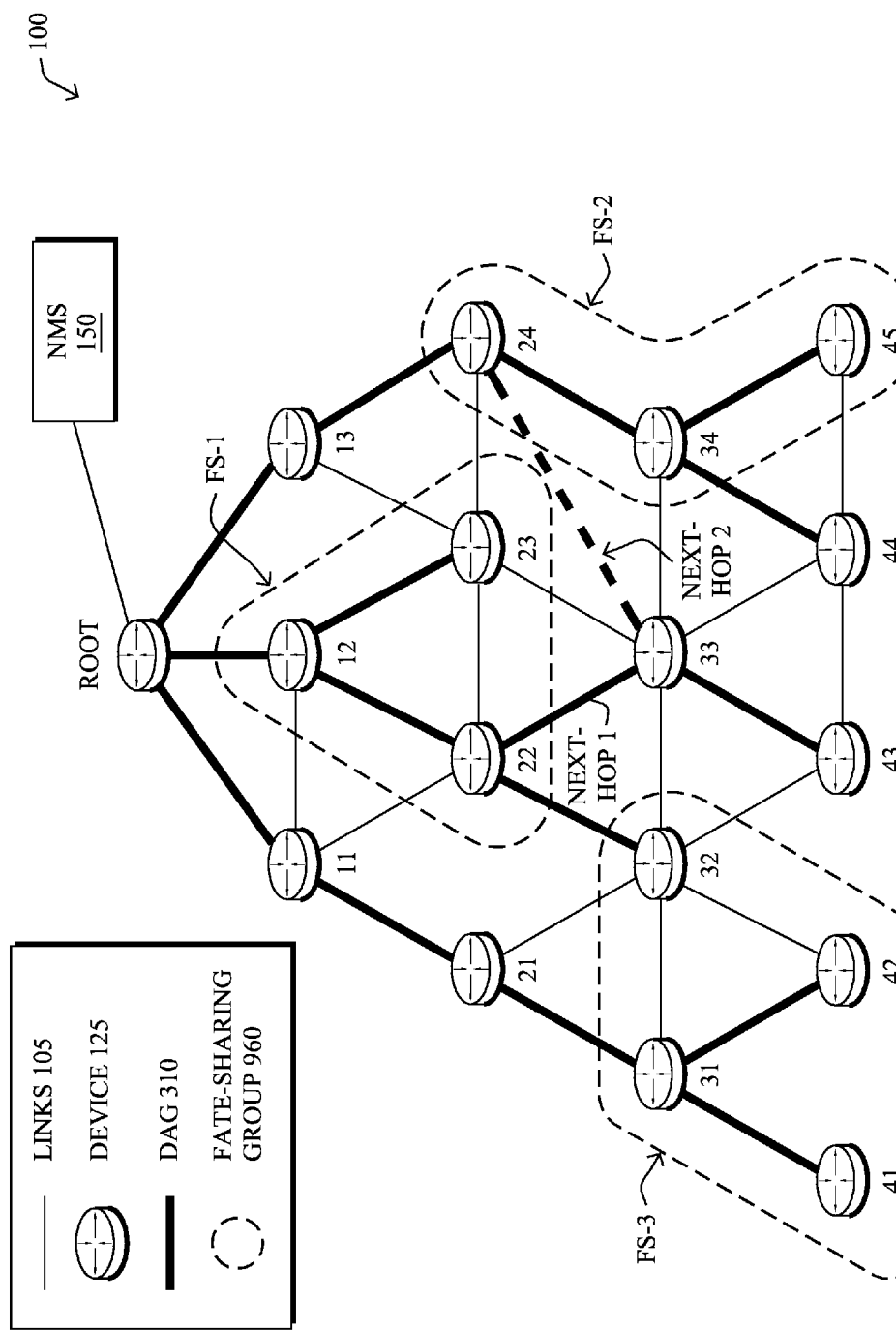
FIG. 12 illustrates an example next-hop selection based on fate-sharing groups.

As shown in FIG. 12, for example, a node (e.g., nod 33) may decide to select a back-up next-hop ("next-hop 2") that does not share the same fate-sharing group as the preferred next-hop ("next-hop 1"). In other words, according to the techniques herein, the nodes may select a plurality of next-hops (e.g., primary/preferred and back-up, first and second, etc.) that minimizes fate-sharing such that none of the selected next-hops are in a same fate-sharing group 960 as any other selected next-hop. As shown in FIG. 12, therefore, node 33 may select node 22 as its first next-hop, and then since node 22 is in FS-1, node 23 is thus removed from consideration (assuming other options exist). Accordingly, since node 24 is not within FS-1 (rather, it is in FS-2, or not any group), node 24 may be selected as the second next-hop. In this manner, should node 22 fail, it should not be expected that node 24 would also fail. This is unlike node 23 , which being part of the same fate-sharing group FS-1 as node 22, is actually expected to likely have also failed with node 22. Note that a node may still select a back-up next-hop within a same fate-sharing group as a primary next-hop if the only next-hops available that are not in the same group are associated with a cost or constraints that are too compromising.

Figure 13:
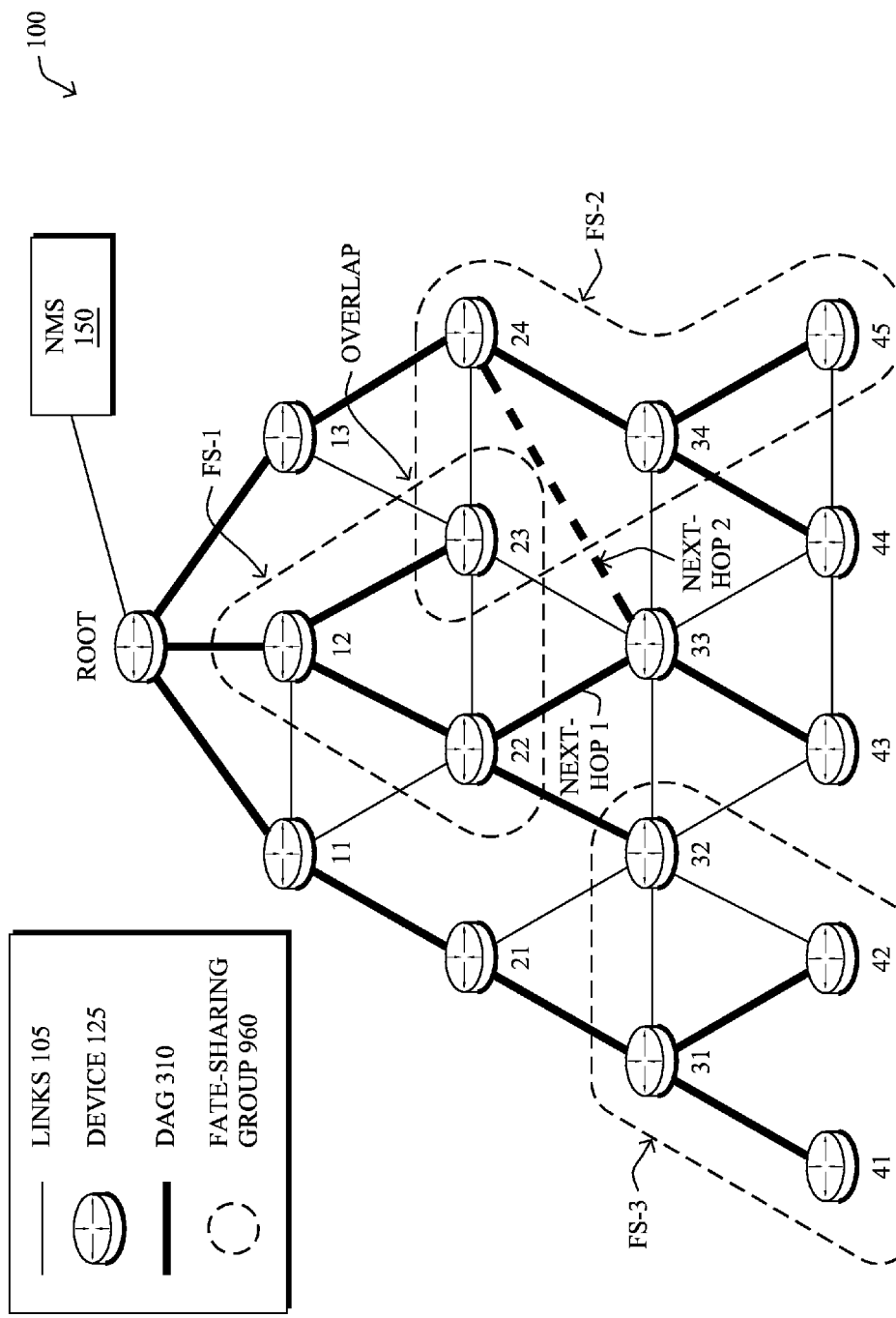
FIG. 13 illustrates an example of overlapped fate-sharing groups.

Notably, though the next-hop selection in FIG. 12 is shown where the fate-sharing groups 960 do not overlap, a similar decision may be made for overlapping groups. For instance, as is shown in FIG. 13, FS-1 and FS-2 do overlap at node 23. However, since selection of node 22 would not result in a selection of node 23, the additional overlap that would prevent selection of node 23 in response to selection of node 24 would not make a difference. Hence, as shown in FIG. 13, the overlap does not change the next-hop selection, since each selected next-hop should be in different groups anyway.

Figure 14A:
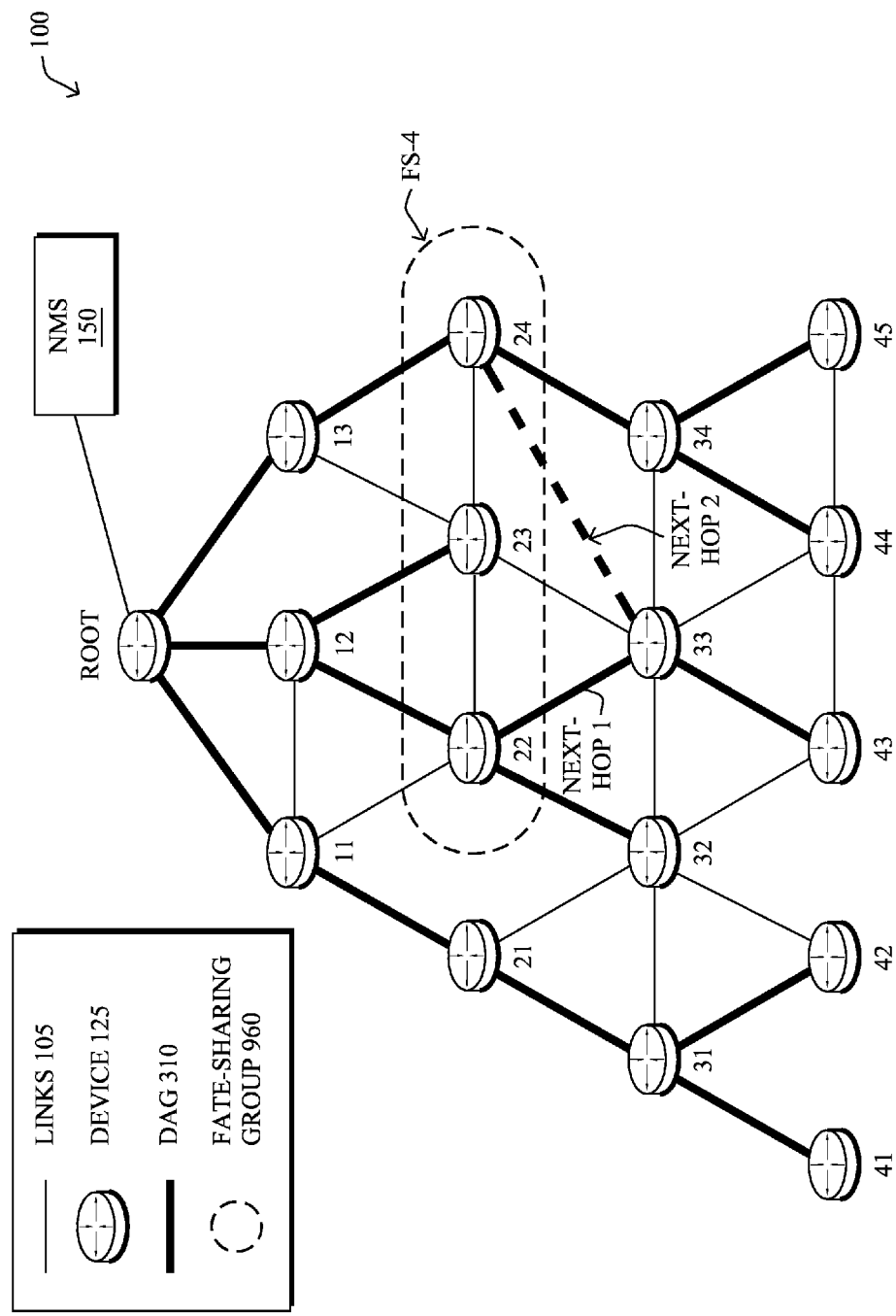
FIG. 14A illustrates an example next-hop selection based on localized fate-sharing.

In many situations, such as where all available (or suitable) next-hop options are within the same fate-sharing group, or if the selecting node itself is within a fate-sharing group with all of its neighbors, no alternative (e.g., back-up) next-hops would be available that do not share the same fate-sharing group. In such a situation, a selecting node may decide to either resort back to simple cost/constraint-based selection of next-hops, or else may select the next-hops (from within the same fate-sharing group) to minimize localized fate-sharing between the selected next-hops (e.g., based on the record 700 of what the selecting node itself has observed). For example, as shown in FIG. 14A, with a newly defined group FS-4 comprising nodes 22, 23, and 24, node 33 may be forced to select the plurality of next-hops from the same group, and as shown, may select node 22 and node 24, based on observing that node 22 and 23 nearly always fail together, but that node 22 and 24 fail together with less observed synchronicity (e.g., based on the example observations in record 700 of FIG. 7).

Figure 14B:
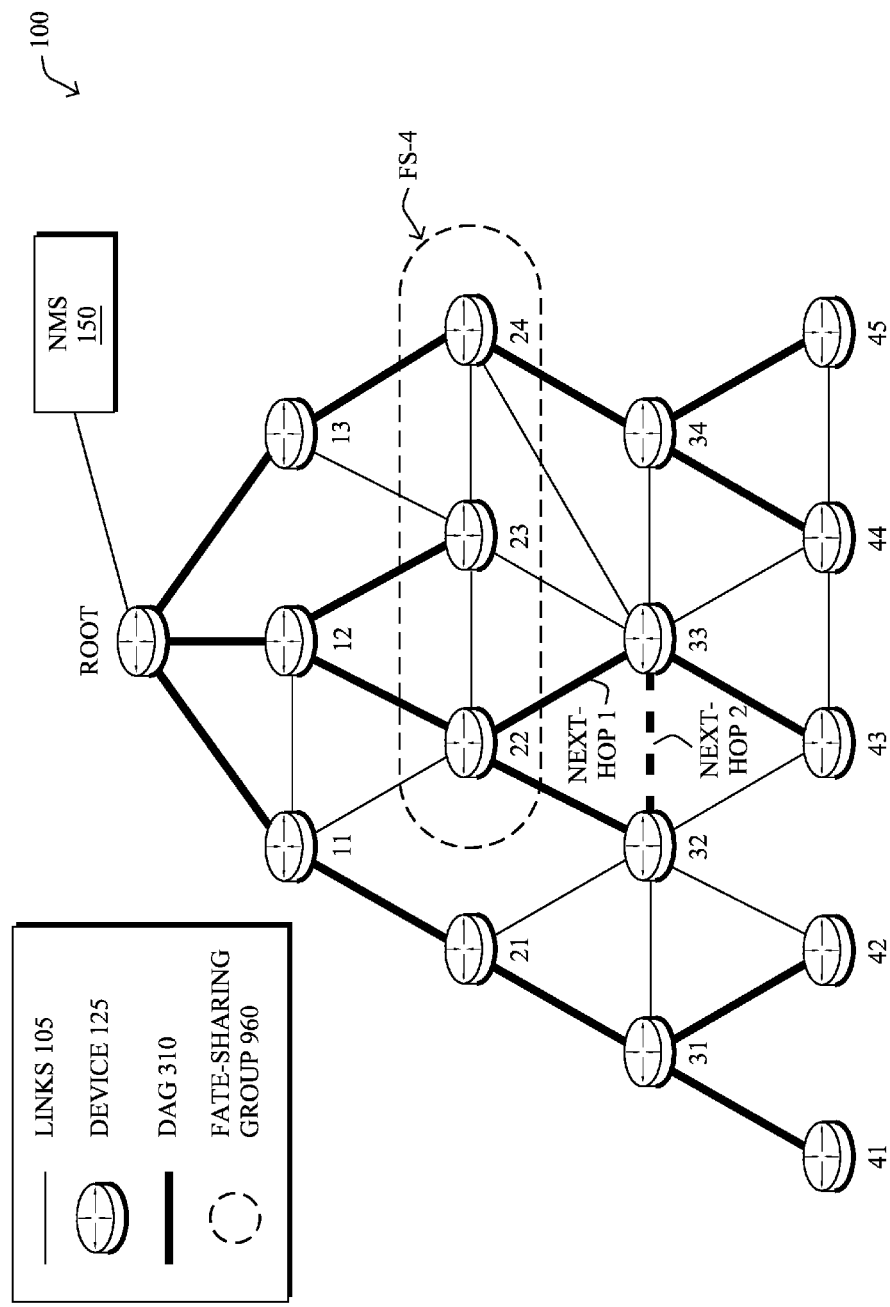
FIG. 14B illustrates another example next-hop selection based on fate-sharing groups.

Note that as an alternative, certain routing decisions may be altered to allow for greater options in next-hop selection. For instance, as shown in FIG. 14B, the selecting node may be permitted to select nodes of the same rank (distance from the root), e.g., "siblings," in order to avoid selecting nodes of the same fate-sharing group as alternative next-hops. This particular embodiment, however, may require visibility to those sibling nodes' next-hop (parent) selection, in order to avoid returning to the same problem area. For instance, as shown in FIG. 14B, if node 32 has selected node 21 as its parent, this solution is viable and helps to avoid the fate-sharing group FS-4. However, had node 32 still selected node 22 as in the previous figures, had node 33 selected node 32 as an alternate next-hop to any node in FS-4, it is possible that node 32 would insert its traffic back into FS-4 anyway. Accordingly, the utility of this embodiment (of FIG. 14B) is limited to certain specific situations (e.g., topologies, protocols, visibility, etc.)

Alternatively or in addition to these rules, a node may determine if the degree of fate-sharing is too high, that is, determining that the fate-sharing between the plurality of selected next-hops surpasses a given threshold. If so, for example, if in FIG. 14A the confidence weighting factor associated with the fate-sharing group FS-4 indicates that it is very likely that both node 22 and node 24 will fail simultaneously, node 33 may activate a redundancy protection scheme (e.g., 1+1) to duplicate packets to the plurality of next-hops, e.g., until the weight value drops.

Figure 15:
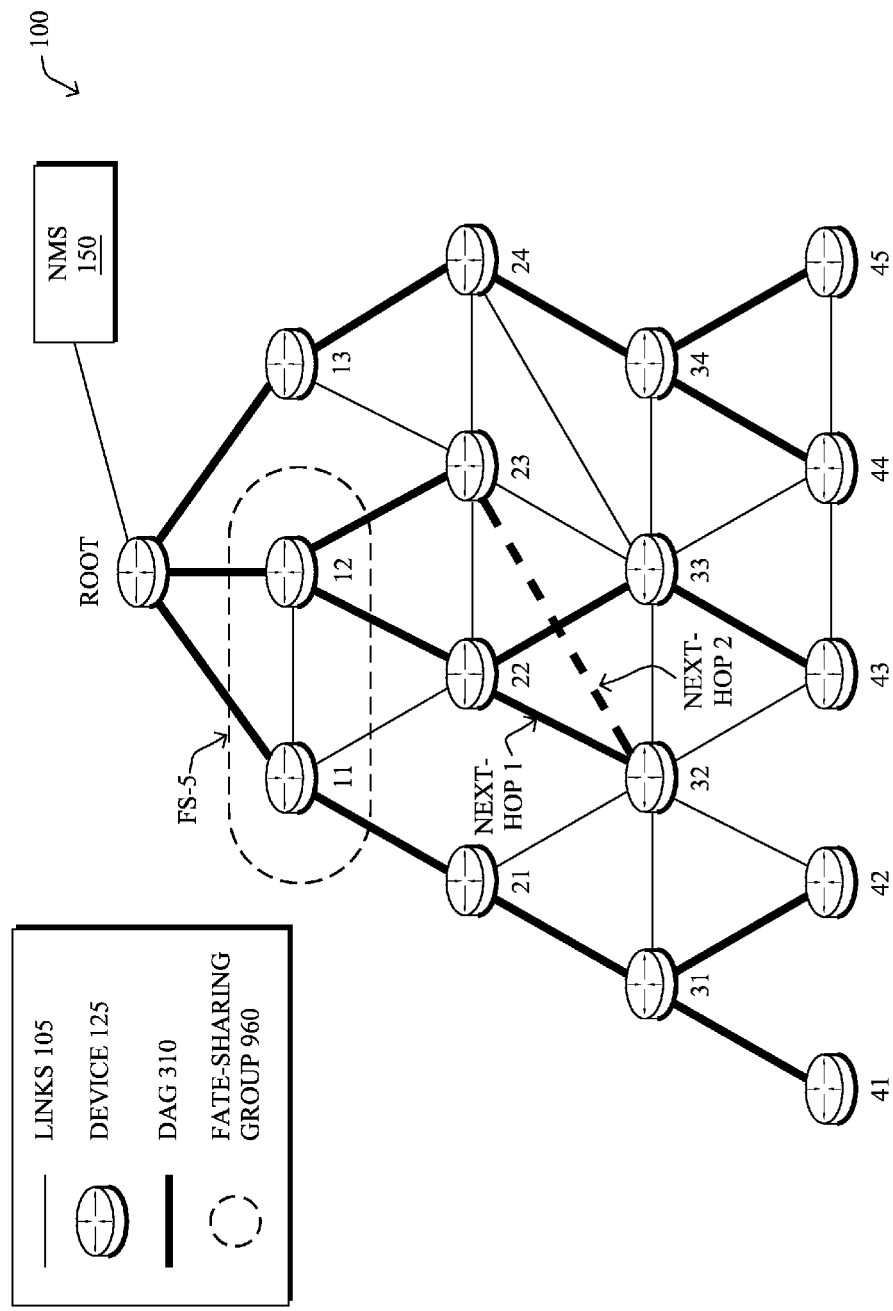
FIG. 15 illustrates an example path selection based on fate-sharing groups.

In yet another embodiment herein, it may be possible to determine fate-sharing between a plurality of paths through the communication network, and to thus select a plurality of paths from the particular node that minimizes fate-sharing between the plurality of paths. For example, as shown in FIG. 15, assume a new fate-sharing group FS-5 that comprises node 11 and node 12. As such, should node 32 be selecting next-hops to avoid nodes within the same fate-sharing group, it would be counter-productive to select nodes 21 and 22 as alternate next-hops (should the node have visibility of the entire path to the root), since according to the resultant paths (e.g., DAG 310), there is a point when both paths (via node 21 and via node 22) will each cross nodes of the same fate-sharing group, FS-5. Accordingly, with available visibility (e.g., knowledge of the topology, probing messages such as reactive routing, etc.), it may be possible to determine the fate-sharing of the paths (e.g., to the root), and to select a different path to minimize fate-sharing between the paths. For example, node 32 may simply select node 23 as an alternative to node 21 (or node 22), where the DAG 310 as shown in FIG. 15 provides the remainder of the path, or else node 32 may create a path (e.g., a source-routed path) according to the desired outcome.

Figure 16:
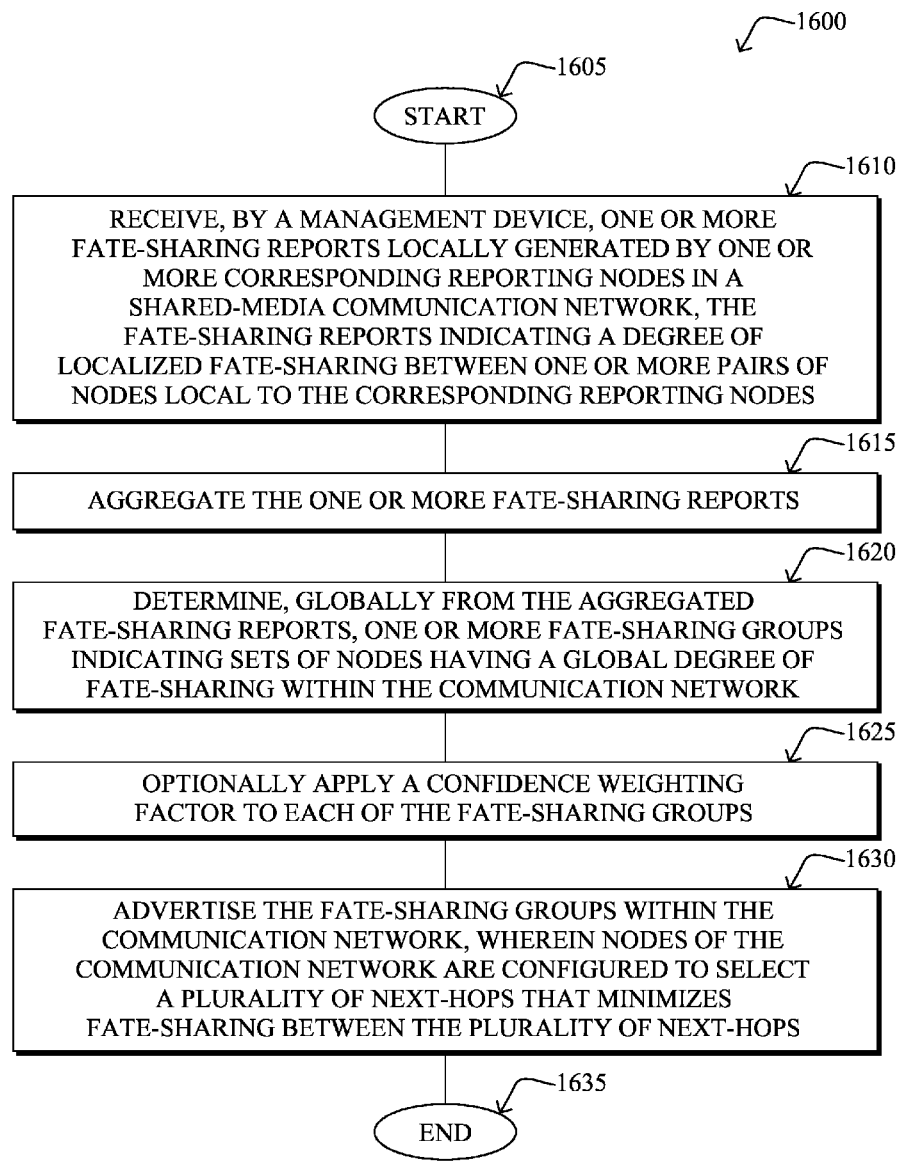
FIG. 16 illustrates an example simplified procedure for management of fate-sharing in a shared-media communication network, particularly from the perspective of a management device.

FIG. 16 illustrates an example simplified procedure for management of fate-sharing in a shared-media communication network in accordance with one or more embodiments described herein, particularly from the perspective of a management device. The procedure 1600 may start at step 1605, and continues to step 1610, where, as described in greater detail above, a management device (e.g., NMS 150) receives one or more fate-sharing reports 840 locally generated by one or more corresponding reporting nodes 125 in a shared-media communication network 100. As noted, the fate-sharing reports indicate a degree of localized fate-sharing between one or more pairs of nodes local to the corresponding reporting nodes. In step 1615, the management device may aggregate the one or more fate-sharing reports and in step 1620 determines, globally from the aggregated fate-sharing reports, one or more fate-sharing groups 960 indicating sets of nodes having a global degree of fate-sharing within the communication network. Optionally, in step 1625, the management device may also apply a confidence weighting factor 1030 to each of the fate-sharing groups. Accordingly, in step 1630, the management device may advertise the fate-sharing groups within the communication network (advertisements 1140), wherein nodes of the communication network are configured to select a plurality of next-hops that minimizes fate-sharing between the plurality of next-hops, e.g., as described in procedure 1700 below. The procedure 1600 may then end in step 1635.

Figure 17A:
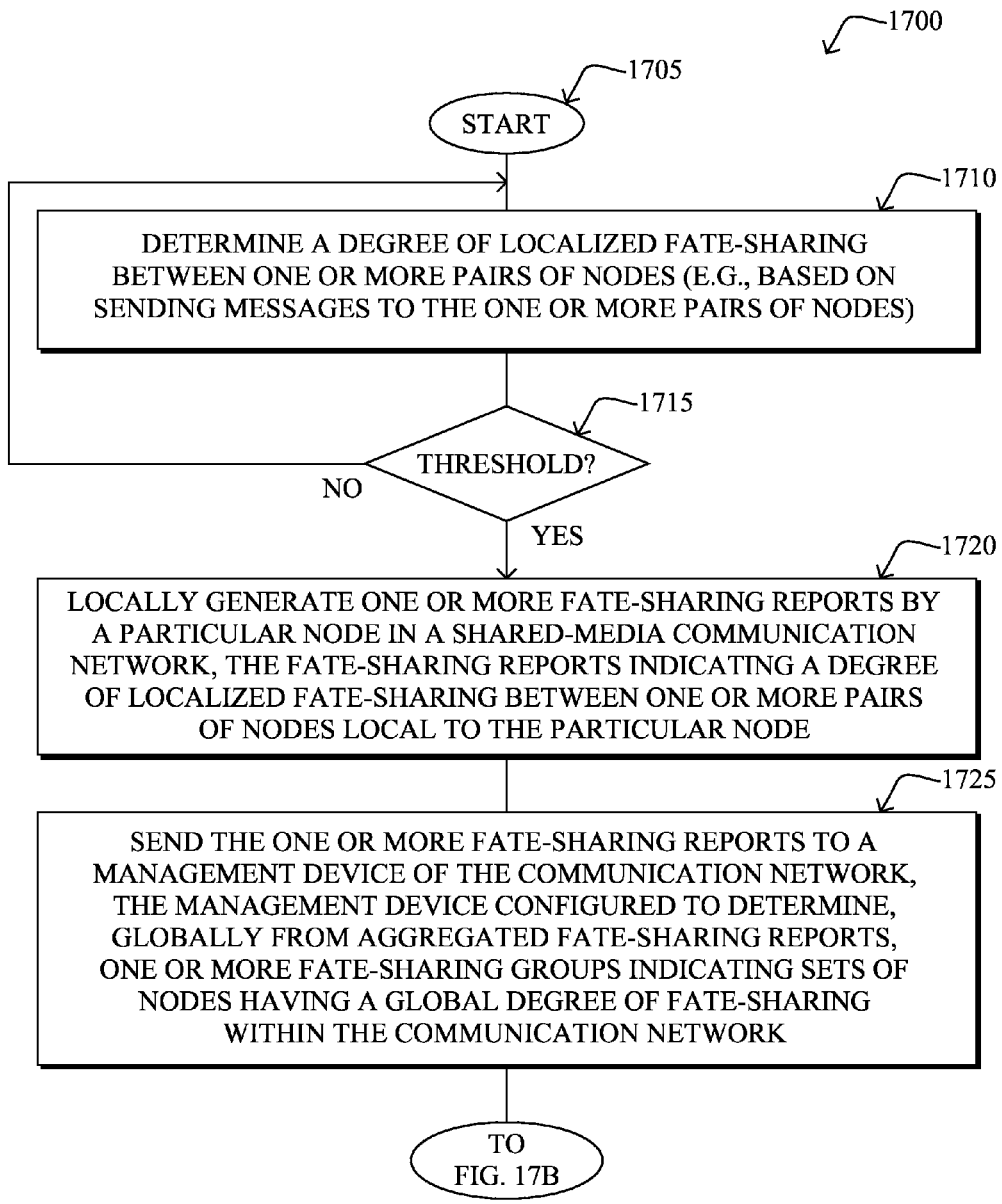
FIGS. 17A-17B illustrate another example simplified procedure for management of fate-sharing in a shared-media communication network, particularly from the perspective of a network node.
Figure 17B:
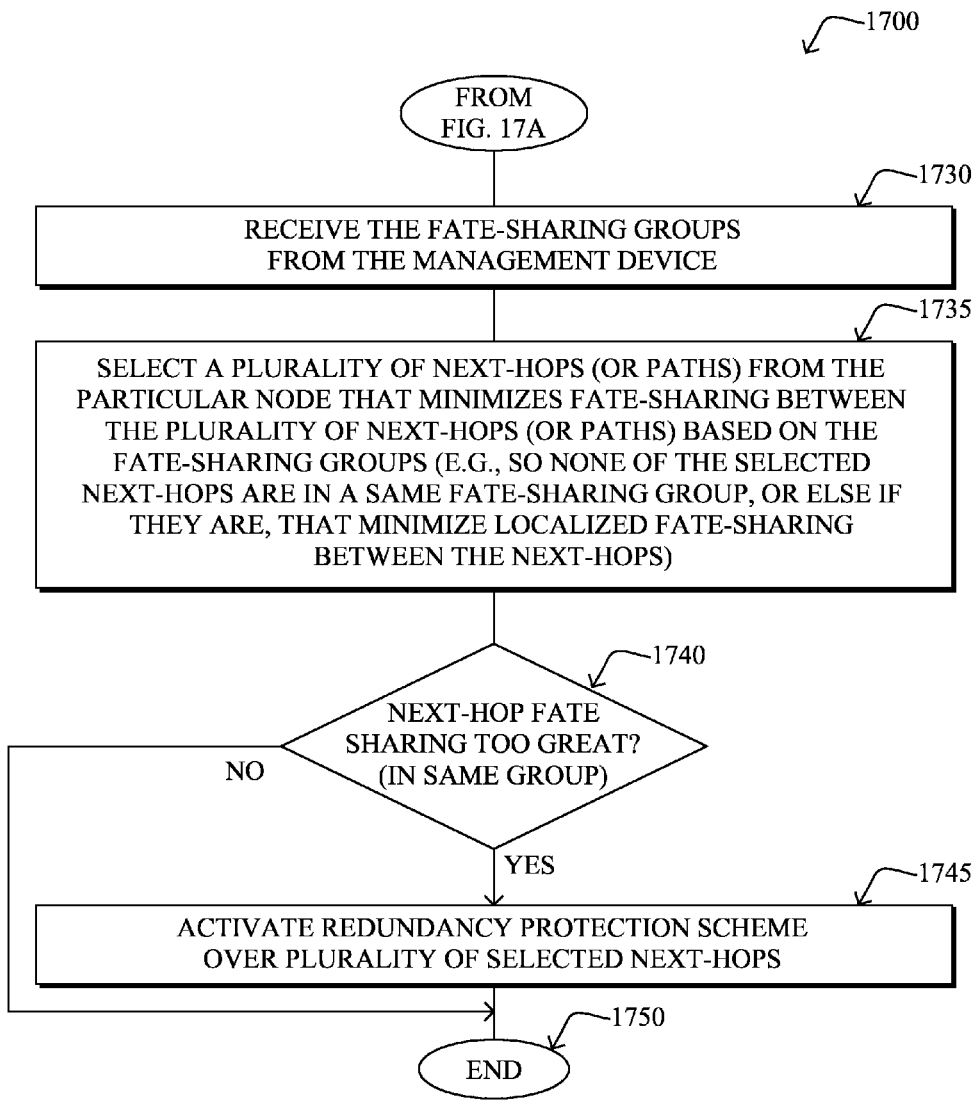

As mentioned, FIGS. 17A-17B illustrate another example simplified procedure 1700 for management of fate-sharing in a shared-media communication network in accordance with one or more embodiments described herein, particularly from the perspective of a network node. The procedure 1700 may start at step 1705, and continues to step 1710, where, as described in greater detail above, a particular network node 125 may determine a degree of localized fate-sharing between one or more pairs of nodes (e.g., based on sending messages 540 to the one or more pairs of nodes, such as data, keepalives, probes, etc.). Note that an example technique for determining the localized fate-sharing is described below with reference to FIG. 18 (procedure 1800). In response, optionally, to the localized fate-sharing surpassing a threshold in step 1715 (or else in response to a dynamic periodicity, e.g., more often if a high degree of fate-sharing, etc.), then in step 1720 the node locally generates one or more fate-sharing reports 840 indicating the degree of localized fate-sharing between one or more pairs of nodes local to the particular node, and in step 1725 sends the one or more fate-sharing reports to a management device of the communication network (e.g., NMS 150), where, as described above in FIG. 16, the management device is configured to determine, globally from aggregated fate-sharing reports, one or more fate-sharing groups 960 indicating sets of nodes having a global degree of fate-sharing within the communication network.

Continuing to FIG. 17B, the procedure 1700 continues to step 1730 where the network node may subsequently (or without having sent any reports of its own) receive the fate-sharing groups 960 from the management device (e.g., in advertisements 1140). Based on the fate-sharing groups, in step 1735 the node may select a plurality of next-hops (or paths) from the particular node that minimizes fate-sharing between the plurality of next-hops (or paths) as described above. For example, the selection may be such that none of the selected next-hops are in a same fate-sharing group, or else if they are, that they minimize localized fate-sharing. Note that if there is fate-sharing (in the same group), and if that fate-sharing is too great (e.g., weight factor 1030) in step 1740, then optionally in step 1745 the node may locally activate a redundancy protection scheme (e.g., 1+1) over the plurality of selected next-hops. The procedure 1700 may then end in step 1750, notably with the ability to update localized fate-sharing, to receive updated fate-sharing groups (and/or weights), or to select new next-hops, accordingly.

Figure 18:
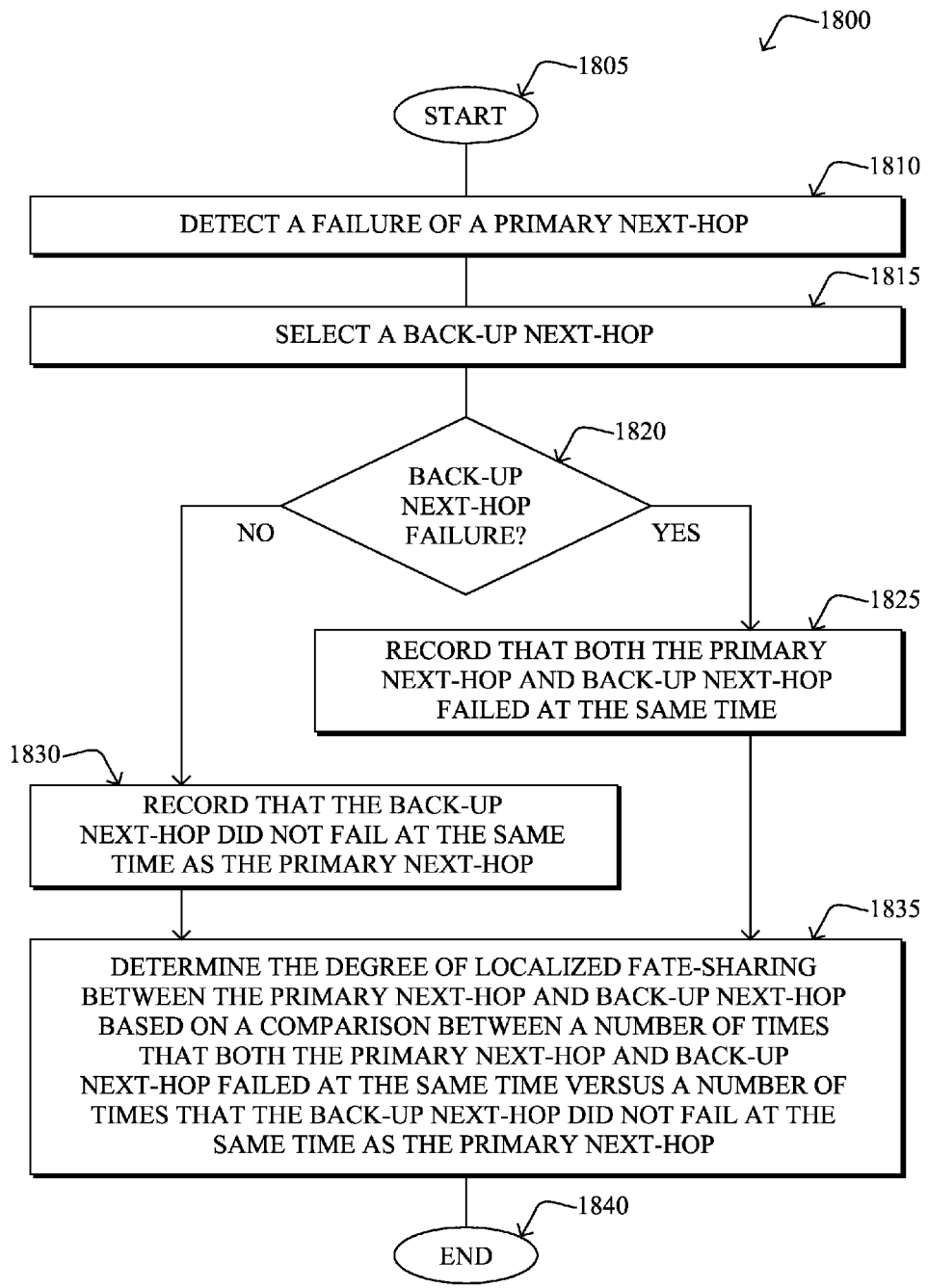
FIG. 18 illustrates another example simplified procedure for management of fate-sharing in a shared-media communication network, particularly illustrating an example technique for determining localized fate-sharing at a network node.

Lastly, FIG. 18, as mentioned above, illustrates another example simplified procedure for management of fate-sharing in a shared-media communication network in accordance with one or more embodiments described herein, particularly illustrating an example technique for determining localized fate-sharing at a network node, in one specific embodiment of the techniques herein. The procedure 1800 may start at step 1805, and continues to step 1810, where, as described in greater detail above, a network node (e.g., node 33) may detect a failure of a primary next-hop (e.g., node 22), and as such, in step 1815 may select a back-up next-hop (e.g., node 23). In response to a failure of the back-up next-hop at the same time in step 1820, then in step 1825 the particular node records that both the primary next-hop and back-up next hop failed at the same time. Alternatively, in response to functionality of the back-up next-hop, in step 1830 the particular node records that the back-up next-hop did not fail at the same time as the primary next-hop. As such, in step 1835, the particular node may determine the degree of localized fate-sharing between the primary next-hop and back-up next-hop based on a comparison between a number of times that both the primary next-hop and back-up next-hop failed at the same time versus a number of times that the back-up next-hop did not fail at the same time as the primary next-hop (e.g., record 700). The illustrative procedure 1800 may end in step 1840, though notably the record 700 may be continually updated based on future events, accordingly.

It should be noted that while certain steps within procedures 1600-1800 may be optional as described above, the steps shown in FIGS. 16-18 are merely examples for illustration, and certain other steps may be included or excluded as desired. Further, while a particular order of the steps is shown, this ordering is merely illustrative, and any suitable arrangement of the steps may be utilized without departing from the scope of the is embodiments herein. Moreover, while procedures 1600-1800 are described separately, certain steps from each procedure may be incorporated into each other procedure, and the procedures are not meant to be mutually exclusive.

The techniques described herein, therefore, provide for fate-sharing management in a shared-media communication network. In particular, the techniques herein effectively compute fate-sharing between nodes, and use the degree of fate-sharing to perform an appropriate routing selection, thus alleviating the tendency of a node selecting next-hops with a high degree of fate-sharing, whether for diverse paths or for general routing topology creation (e.g., preferred and back-up next-hops). In this manner, the techniques herein increase the robustness of the network, since by avoiding selecting a preferred next-hop and back-up next-hops that have a high probability of sharing fate (and thus becoming affected by the same failure), the chances are enhanced to locally reroute a packet via a simple decision without having to trigger a very costly repair of the topology (e.g., locally or a more expensive global repair). The techniques herein may be used for back-up paths, load-balancing paths, redundant paths, etc.

Note that the notion of Shared Link Risk Groups (SRLGs) has been used in IP/MPLS networks with IGP extensions to report that some links were sharing the same components of an infrastructure. For example, a set of links may share the same fiber (e.g., using DWDM) and thus the failure of such fiber may affect all links. Knowing the SRLG would help not using a link, n, along a back-up path used to protect a link, m, sharing a common SRLG. The problem in shared-media networks, however, is quite different since the risk-sharing is dynamic and non-deterministic, making the problem much more difficult. That is, the notion of a "shared link" is different: in IP/MPLS networks, a shared link is a physically shared medium, such that if a shared link fails (such as a fiber) all links sharing that link (fiber) fail. By contrast, shared risk in a shared-media communication network is based on interference, such that increased noise on shared wireless or PLC links may generally only affect a subset of these links to the point of failure.

While there have been shown and described illustrative embodiments that provide for fate-sharing management in a shared-media communication network, it is to be understood that various other adaptations and modifications may be made within the spirit and scope of the embodiments herein. For example, the embodiments have been shown and described herein with relation to LLNs. However, the embodiments in their broader sense are not as limited, and may, in fact, be used with other types of shared-media networks and/or protocols. In addition, while certain protocols are shown, such as RPL, other suitable protocols may be used, accordingly. Also, while the techniques generally describe distributed computation of the fate-sharing by a head-end node such as the NMS 150, the root node or other device with appropriate visibility may also be used to provide the fate-sharing computation (or path/route computation), accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
receiving, by a management device, one or more fate-sharing reports, the fate-sharing reports indicating a degree of localized fate-sharing between one or more pairs of nodes local to corresponding reporting nodes;
aggregating the one or more fate-sharing reports;
determining, globally from the aggregated fate-sharing reports, one or more fate-sharing groups indicating sets of nodes having a global degree of fate-sharing within the communication network; and
advertising the fate-sharing groups within the communication network to be used by nodes in the communication network to select a plurality of next-hops that minimizes fate-sharing between the plurality of next-hops.

2. The method as in claim 1, further comprising:
applying a confidence weighting factor to each of the fate-sharing groups.

3. The method as in claim 1, wherein the fate-sharing reports indicate the degree of localized fate-sharing between one or more pairs of nodes based on a ratio of a number of times communication with a specific pair of nodes failed at the same time versus a number of times the communication with the specific pair of nodes did not fail at the same time.

4. A method, comprising:

generating one or more fate-sharing reports by a particular node, the fate-sharing reports indicating a degree of localized fate-sharing between one or more pairs of nodes local to the particular node;

sending the one or more fate-sharing reports to a management device of the communication network;

receiving fate-sharing groups from the management device, the fate-sharing groups indicating sets of nodes having a global degree of fate-sharing within the communication network; and selecting a plurality of next-hops from the particular node that minimizes fate-sharing between the plurality of next-hops based on the fate-sharing groups.

5. The method as in claim 4, wherein locally generating one or more fate-sharing reports comprises:

detecting a failure of a primary next-hop;

selecting a back-up next-hop;

in response to failure of the back-up next-hop, recording that both the primary next-hop and back-up next-hop failed at the same time;

in response to functionality of the back-up next-hop, recording that the back-up next-hop did not fail at the same time as the primary next-hop; and determining the degree of localized fate-sharing between the primary next-hop and back-up next-hop based on a comparison between a number of times that both the primary next-hop and back-up next-hop failed at the same time versus a number of times that the back-up next-hop did not fail at the same time as the primary next-hop.

6. The method as in claim 4, wherein locally generating one or more fate-sharing reports comprises:

determining the degree of localized fate-sharing between one or more pairs of nodes based on sending messages to the one or more pairs of nodes, the messages selected from a group consisting of: data messages; keepalive messages; and explicit fate-sharing probe messages.

7. The method as in claim 4, wherein selecting a plurality of next-hops that minimizes fate-sharing comprises:

selecting the plurality of next-hops such that none of the selected next-hops are in a same fate-sharing group as any other selected next-hop.

8. The method as in claim 4, wherein selecting a plurality of next-hops that minimizes fate-sharing comprises:

selecting at least two next-hops of the plurality of next-hops that are in a same fate-sharing group as each other, wherein the at least two next-hops are selected to minimize localized fate-sharing between the at least two next-hops.

9. The method as in claim 4, wherein sending the one or more fate-sharing reports comprises:

sending a particular fate-sharing report in response to the degree of localized fate-sharing between a corresponding particular pair of nodes surpassing a configured threshold.

10. The method as in claim 4, wherein the fate-sharing reports indicate the degree of localized fate-sharing between one or more pairs of nodes based on a ratio of a number of times communication with a specific pair of nodes failed at the same time versus a number of times the communication with the specific pair of nodes did not fail at the same time.

11. The method as in claim 4, further comprising:

determining that the fate-sharing between the plurality of selected next-hops surpasses a given threshold; and, in response;

activating a redundancy protection scheme over the plurality of selected next-hops.

12. The method as in claim 4, wherein sending the fate-sharing reports comprises one of either including the reports within one or more dedicated report messages or including the reports within routing control messages.

13. The method as in claim 4, further comprising:

determining fate-sharing between a plurality of paths through the communication network; and selecting a plurality of paths from the particular node that minimizes fate-sharing between the plurality of paths.

14. An apparatus, comprising:

one or more network interfaces;

a processor coupled to the network interfaces and adapted to execute one or more processes; and a memory configured to store a process executable by the processor, the process when executed operable to:

receive one or more fate-sharing reports, the fate-sharing reports indicating a degree of localized fate-sharing between one or more pairs of nodes local to corresponding reporting nodes;

aggregate the one or more fate-sharing reports;

determine, globally from the aggregated fate-sharing reports, one or more fate-sharing groups indicating sets of nodes having a global degree of fate-sharing within the communication network; and advertise the fate-sharing groups within the communication network to be used by nodes in the communication network to select a plurality of next-hops that minimizes fate-sharing between the plurality of next-hop.

15. The apparatus as in claim 14, wherein the process when executed is further operable to:

apply a confidence weighting factor to each of the fate-sharing groups.

16. An apparatus, comprising:

one or more network interfaces to communicate in a shared-media communication network;

a processor coupled to the network interfaces and adapted to execute one or more processes; and a memory configured to store a process executable by the processor, the process when executed operable to:

generate one or more fate-sharing reports by a particular node, the fate-sharing reports indicating a degree of localized fate-sharing between one or more pairs of nodes local to the particular node;

send the one or more fate-sharing reports to a management device of the communication network;

receive fate-sharing groups from the management device, the fate-sharing groups indicating sets of nodes having a global degree of fate-sharing within the communication network; and select a plurality of next-hops from the particular node that minimizes fate-sharing between the plurality of next-hops based on the fate-sharing groups.

17. The apparatus as in claim 16, wherein the process when executed to locally generate one or more fate-sharing reports is further operable to:

detect a failure of a primary next-hop;

select a back-up next-hop;

in response to failure of the back-up next-hop, record that both the primary next-hop and back-up next-hop failed at the same time;

in response to functionality of the back-up next-hop, record that the back-up next-hop did not fail at the same time as the primary next-hop; and determine the degree of localized fate-sharing between the primary next-hop and back-up next-hop based on a comparison between a number of times that both the primary next-hop and back-up next-hop failed at the same time versus a number of times that the back-up next-hop did not fail at the same time as the primary next-hop.

18. The apparatus as in claim 16, wherein the process when executed to locally generate one or more fate-sharing reports is further operable to:
  determine the degree of localized fate-sharing between one or more pairs of nodes based on sending messages to the one or more pairs of nodes, the messages selected from a group consisting of: data messages; keepalive messages; and explicit fate-sharing probe messages.

19. The apparatus as in claim 16, wherein the process when executed to select a plurality of next-hops that minimizes fate-sharing is further operable to:
  select the plurality of next-hops such that none of the selected next-hops are in a same fate-sharing group as any other selected next-hop.

20. The apparatus as in claim 16, wherein the process when executed to select a plurality of next-hops that minimizes fate-sharing is further operable to:
  select at least two next-hops of the plurality of next-hops that are in a same fate-sharing group as each other, wherein the at least two next-hops are selected to minimize localized fate-sharing between the at least two next-hops.

21. The apparatus as in claim 16, wherein the process when executed to send the one or more fate-sharing reports is further operable to:
  send a particular fate-sharing report in response to the degree of localized fate-sharing between a corresponding particular pair of nodes surpassing a configured threshold.

22. The apparatus as in claim 16, wherein the fate-sharing reports indicate the degree of localized fate-sharing between one or more pairs of nodes based on a ratio of a number of times communication with a specific pair of nodes failed at the same time versus a number of times the communication with the specific pair of nodes did not fail at the same time.

23. The apparatus as in claim 16, wherein the process when executed is further operable to:
  determine that the fate-sharing between the plurality of selected next-hops surpasses a given threshold; and, in response;
  activate a redundancy protection scheme over the plurality of selected next-hops.

24. The apparatus as in claim 16, wherein the process when executed is further operable to:
  determine fate-sharing between a plurality of paths through the communication network; and
  select a plurality of paths from the particular node that minimizes fate-sharing between the plurality of paths.

* * * * *

UNITED STATES PATENT AND TRADEMARK OFFICE
CERTIFICATE OF CORRECTION

PATENT NO. : 8,954,582 B2  Page 1 of 1
APPLICATION NO. : 14/154875
DATED : February 10, 2015
INVENTOR(S) : Vasseur et al.

It is certified that error appears in the above-identified patent and that said Letters Patent is hereby corrected as shown below:

In the Specification

In column 11, line 54, should read:
assigned to a fate-sharing group are, in fact, affected by the

In column 15, line 40, should read:
scope of the embodiments herein. Moreover, while proce-

Signed and Sealed this
Eighth Day of September, 2015

Michelle K. Lee
*Director of the United States Patent and Trademark Office*